(12) United States Patent
Shirota et al.

(10) Patent No.: US 6,854,513 B2
(45) Date of Patent: Feb. 15, 2005

(54) VEHICLE AIR CONDITIONING SYSTEM WITH COLD ACCUMULATOR

(75) Inventors: Yuichi Shirota, Anjo (JP); Koji Takahashi, Kariya (JP); Koichi Ban, Tokai (JP); Yasushi Yamanaka, Nakashima-gun (JP); Sadayuki Kamiya, Kariya (JP); Eiichi Torigoe, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/865,750

(22) Filed: May 25, 2001

(65) Prior Publication Data

US 2002/0002837 A1 Jan. 10, 2002

(30) Foreign Application Priority Data

| May 26, 2000 | (JP) | ........................... 2000-157196 |
| Sep. 5, 2000 | (JP) | ........................... 2000-269081 |
| Mar. 16, 2001 | (JP) | ........................... 2001-76956 |
| Apr. 4, 2001 | (JP) | ........................... 2001-106412 |

(51) Int. Cl.[7] .............................. B60H 3/00; B60H 1/00
(52) U.S. Cl. ...................... 165/203; 165/10; 165/42; 165/132; 165/289; 62/244; 62/503
(58) Field of Search .............................. 165/10, 42, 43, 165/44, 51, 204, 203, 202, 271, 289, 132; 62/239, 244, 83, 503

(56) References Cited

U.S. PATENT DOCUMENTS

| 4,425,765 A | * | 1/1984 | Fukushima et al. |
| 4,637,222 A | * | 1/1987 | Fujiwara et al. ............... 62/244 |
| 4,969,509 A | * | 11/1990 | Merensky .............. 165/104.34 |
| 5,261,241 A | * | 11/1993 | Kitahara et al. ....... 165/104.12 |
| 5,505,060 A | * | 4/1996 | Kozinski ................ 165/132 X |
| 5,617,730 A | * | 4/1997 | Suzuki |
| 5,694,783 A | * | 12/1997 | Bartlett |
| 5,701,753 A | * | 12/1997 | Iritani |
| 5,813,248 A | * | 9/1998 | Zornes et al. ................. 62/480 |
| 6,185,957 B1 | * | 2/2001 | Voss et al. ................ 62/503 X |
| 6,220,337 B1 | * | 4/2001 | Chen et al. .................... 165/10 |
| 6,227,285 B1 | * | 5/2001 | Hildebrand et al. .......... 165/10 |
| 6,260,376 B1 | * | 7/2001 | Khelifa et al. ................ 62/435 |
| 6,405,793 B1 | * | 6/2002 | Ghodbane et al. .......... 165/203 |
| 6,467,300 B1 | * | 10/2002 | Noble, III ..................... 62/503 |
| 6,474,089 B1 | * | 11/2002 | Chen |

FOREIGN PATENT DOCUMENTS

| JP | A-H1-153321 | 6/1989 | |
| JP | A-2000-38015 | 2/2000 | |
| SU | 1740952 A1 | * 6/1992 | .................. 165/10 |

* cited by examiner

*Primary Examiner*—Ljiljana Ciric
(74) *Attorney, Agent, or Firm*—Harness, Dickey & Pierce, PLC

(57) ABSTRACT

In a vehicle air conditioning system, a cold accumulator is disposed between a downstream air side of a cooling heat exchanger and an upstream air side of a heating heat exchanger to be cooled by cold air having passed through the cooling heat exchanger. Further, the cold accumulator is disposed at the upstream air side of an air mixing door.

30 Claims, 18 Drawing Sheets

VEHICLE AIR CONDITIONING SYSTEM WITH COLD ACCUMULATOR

CROSS-REFERENCE TO RELATED APPLICATION

This application is related to Japanese Patent Applications No. 2000-157196 filed on May 26, 2000, No. 269081 filed on Sep. 5, 2000, No. 2001-76956 filed on Mar. 16, 2001 and No. 2001-106412 filed on Apr. 4, 2001, the contents of which are hereby incorporated by reference.

BACKGROUND OF THE INVENTION

1. Field of the Invention

The present invention relates to a cold-accumulating type air conditioning system for a vehicle, provided with a cold accumulator cooled by cold air after passing through a cooling heat exchanger. This air conditioning system is suitably used for a vehicle which temporarily stops its engine, which is used as the drive source of a compressor when the vehicle stops.

2. Description of Related Art

In recent years, in order to protect the environment, a vehicle (economically running vehicle, hybrid vehicle, or the like) automatically stops its engine when the vehicle stops such as when waiting for a change of a traffic signal, and there is a tendency to increase the number of these vehicles which stops their engine at the stoppage of the vehicle.

In an air conditioning system for a vehicle, a compressor of a refrigerating cycle is generally driven by a vehicular engine. Therefore, in the economically running vehicle or the like described above, at the stoppage of the vehicle, such as when waiting for the change of the traffic signal, the compressor is also stopped. Accordingly, an increase in the temperature of a cooling heat exchanger (evaporator) is increased, an air temperature blown into a passenger compartment is increased, and therefore, a reduction in the cooling of a passenger in the passenger compartment is experienced.

JP-A-2000-38015 describes a cold-accumulating type air conditioning system for a vehicle provided with a cold accumulator. In this system, the cold accumulator accumulates cold at time of operation of a compressor, and air blown into the passenger compartment is cooled by the cold accumulator during the stoppage of the compressor (at time of stoppage the cooling operation of a cooling heat exchanger). However, the cold accumulator is integrally formed with an air mixing door for adjusting an air volume ratio between cold air passing through a bypath passage while bypassing a heating heat exchanger, and hot air passing through the heating heat exchanger. In this case, since the cold accumulator is integrally rotated with the air mixing door, an exposed condition of cold air to the cold accumulator is changed by the rotation of the air mixing door, and a change in the capability of the cold accumulation of the cold accumulator is experienced. Further, since the cold accumulator is provided on a surface of the air mixing door at a side of the bypath passage, when the air mixing door is displaced to the closing side of the bypath passage, the capability of the cold accumulation of the cold accumulator is lowered.

On the other hand, in JP-A-H1-153321, there is proposed a cold accumulator which is arranged in an air passage between a cooling heat exchanger and a heating heat exchanger. Further, a refrigerant pipe of a refrigerant cycle is disposed within the cold accumulator, and the cold accumulator is cooled by the cold of the refrigerant pipe. However, since the refrigerant pipe is arranged in the cold accumulator, a construction of the cold accumulator becomes complicated, and thus leads to an increase in cost.

SUMMARY OF THE INVENTION

In view of the foregoing problems, it is an object of the present invention to provide a vehicle air conditioning system having a cold accumulator which is sufficiently cooled by cold air from a cooling heat exchanger while having a simple structure.

It is an another object of the present invention to provide a vehicle air conditioning system with a cold accumulator, which can restrict a change of a cold-accumulating capability in the cold accumulator due to a position change of air-conditioning equipment, while simplifying a structure of the cold accumulator.

It is a further object of the present invention to provide a vehicle air conditioning system with a cold accumulator, which can reduce the power consumed by a compressor while obtaining a rapid cold accumulating effect of the cold accumulator.

According to the present invention, in a vehicle air conditioning system, a cold accumulator is disposed between a downstream side of a cooling heat exchanger and an upstream side of an air mixing door in an air flow direction to be cooled by cold air having passed through the cooling heat exchanger. Therefore, the accumulator can be sufficiently cooled by the cold air having passed through the cooling heat exchanger, and a cold-accumulating capacity in the cold accumulator can be stably obtained without being affected by a rotation position of the air mixing door. Further, because the cold accumulator is cooled by cold air from the cooling heat exchanger, the structure of the cold accumulator can be made simple.

Preferably, a bypass passage through which air bypasses the cooling heat exchanger and the cold accumulator is provided, and a bypass door is disposed to adjust a flow amount of air passing through the bypass passage. Therefore, when it is unnecessary to decrease the temperature of air blown into a passenger compartment, air bypassing the cooling heat exchanger and the cold accumulator is mixed with air passing through the cooling heat exchanger and the cold accumulator, so that a desired temperature of air to be blown into the passenger compartment can be obtained. Accordingly, heat load of the cooling heat exchanger can be reduced, and the cooling system power required for reducing the temperature in the cooling heat exchanger can be reduced.

Preferably, the cold accumulator has at least a first cold accumulating portion and a second cold accumulating portion. The first cold accumulating portion has therein a first cold accumulating material, and the second cold accumulating portion has therein a second cold accumulating material different from the first cold accumulating material. Therefore, it is possible to change a cold accumulating degree in the cold accumulator based on the air-conditioning heat load. In addition, the first cold accumulating material has a melting point higher than that of the second cold accumulating material, and the first cold accumulating portion is disposed at an upstream side of the second cold accumulating portion in the air flow direction. Therefore, a temperature difference between cold air from the cooling heat exchanger and the first cold accumulating material can be made larger, and the cold accumulation of the first cold accumulating material with the higher melting point can be made simple.

In addition, a control unit is disposed to control the temperature of the cooling heat exchanger to a target cooling temperature. In a cold accumulation mode for performing a cold accumulation in the cold accumulator, the control unit sets the target cooling temperature of the cooling heat exchanger at an initial target temperature. Further, when the control unit determines a finish of the cold accumulation in the cold accumulator, the control unit sets the target cooling temperature to be switched from the initial target temperature to a predetermined temperature that is higher than the initial target temperature. Therefore, in the cold accumulation mode, the cold accumulator can be cooled rapidly using a low-temperature cold air corresponding to the initial target temperature of the cooling heat exchanger. On the other hand, after the cold accumulation in the cold accumulator is finished, the temperature of the cooling heat exchanger can be increased. Therefore, when the cooling heat exchanger is an evaporator of a refrigerant cycle, the power consumed by the compressor can be reduced.

Preferably, after a predetermined time passes after the finish of the cold accumulation in the cold accumulator, the control unit switches the predetermined target temperature to an air-conditioning target temperature determined based on an air-conditioning environment condition. Accordingly, in this case, the cower consumed by the compressor can be further reduced in accordance with the air-conditioning environment condition.

On the other hand, in another vehicle air conditioning system according to the present invention, a heating adjustment member is disposed to adjust a heating capacity of a heating heat exchanger, and a cold accumulator is disposed between a downstream side of a cooling heat exchanger and an upstream side of the heating heat exchanger in the air flow direction to be cooled by cold air having passed through the cooling heat exchanger. In this case, the temperature of air blown into the passenger compartment can be adjusted using the heating adjustment member without using an air mixing door. Accordingly, cold air can be directly introduced into the cold accumulator, and cold accumulating capacity in the cold accumulator can be stably obtained without being affected by an operation position of the air-conditioning equipment in the vehicle air conditioning system, while the cold accumulator has a simple structure.

BRIEF DESCRIPTION OF THE DRAWINGS

Additional objects and advantages of the present invention will be more readily apparent from the following detailed description of preferred embodiment when taken together with the accompanying drawings, in which.

DETAILED DESCRIPTION OF THE PREFERRED EMBODIMENTS (First Embodiment)

Figure 1:
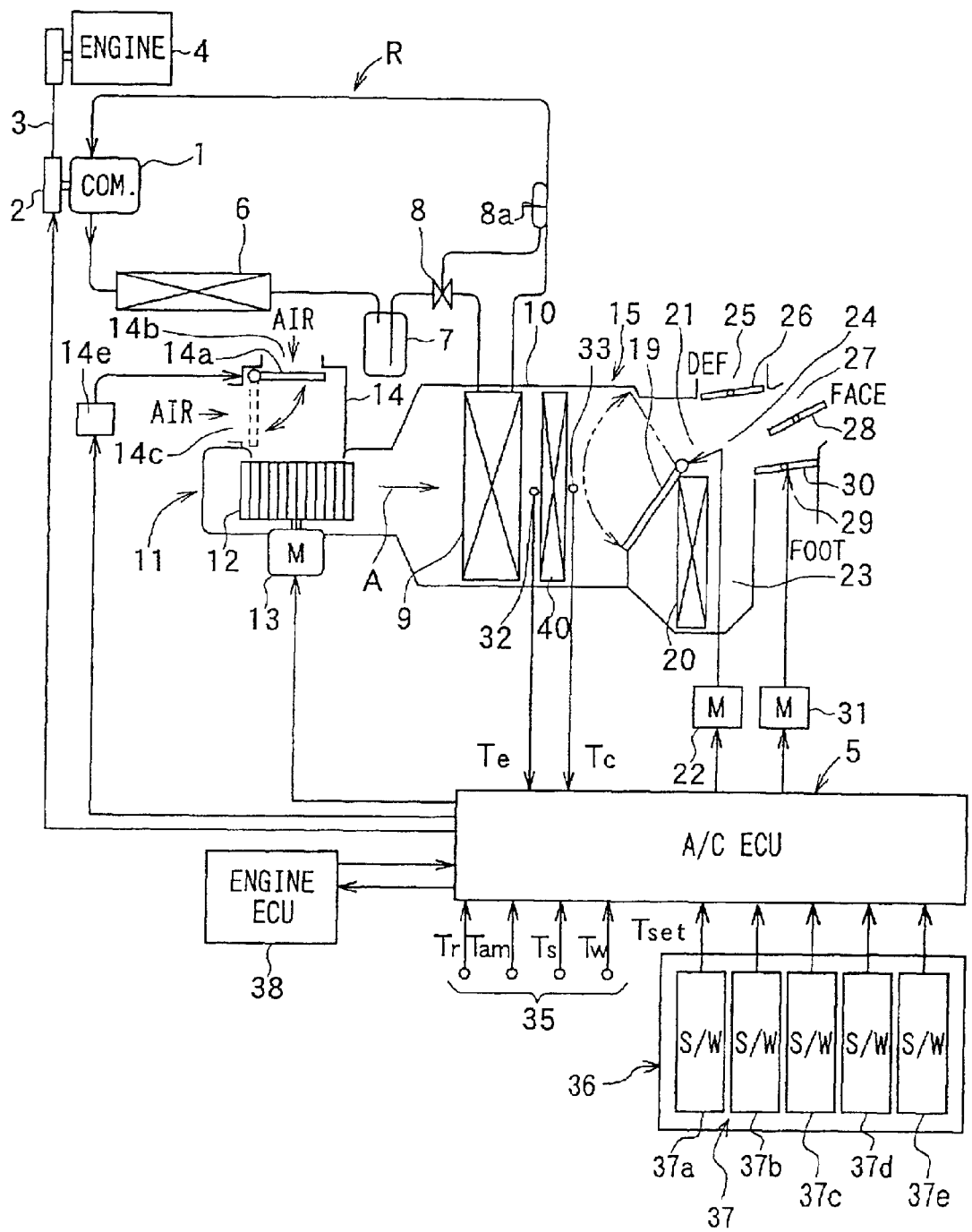
FIG. 1 is a schematic diagram showing an air conditioning system according to a first preferred embodiment of the present invention.

FIG. 1 is a view illustrating an entire constitution of a first embodiment. A refrigerating cycle R of an air conditioning system for a vehicle has a compressor 1 for sucking, compressing, and discharging a refrigerant, and the compressor 1 is provided with an electromagnetic clutch 2 for intermittent power. Since the power from a vehicular engine 4 is transmitted to the compressor 1 via the electromagnetic clutch 2 and a belt 3, an operation of the compressor 1 is intermittent according to an intermittent current carried to the electromagnetic clutch 2 by an air-conditioning electronic control unit (ECU) 5.

A super-heated gas refrigerant having a high temperature and a high pressure, discharged from the compressor 1, flows into a condenser 6, and is heat-exchanged with outside air blown by a cooling fan (not illustrated) to be cooled and condensed. The refrigerant condensed in the condenser 6, next, flows into a receiver 7, gas and liquid of the refrigerant are separated at an inner section of the receiver 7, and a surplus refrigerant (liquid refrigerant) inside the refrigerating cycle R is stored within the receiver 7.

A liquid refrigerant from the receiver 7 is decompressed by an expansion valve (pressure reducing means) 8 to become a gas-liquid two phase having a low pressure. The expansion valve 8 is a thermal-type expansion valve having a temperature sensing section 8a for sensing a temperature of an outlet refrigerant of on evaporator (cooling heat exchanger) 9. The low-pressure refrigerant from the expansion valve 8 flows into the evaporator 9. The evaporator 9 is installed inside an air conditioning case 10 of the air conditioning system for a vehicle. The low-pressure refrigerant flowing into the evaporator 9 absorbs heat from air within the air conditioning case 10 and is evaporated. A refrigerant outlet of the evaporator 9 is coupled to a refrigerant suction side of the compressor 1, and a closed refrigerant circuit is constructed by the cycle components described above.

In the air conditioning case 10, a blower 11 is disposed at an upstream air side of the evaporator 9, and the blower 11 is provided with a centrifugal type blowing fan 12 and a driving motor 13. At an air suction side of the blowing fan 12, an inside/outside air switching box 14 is arranged. The inside/outside air switching box 14 has an outside air introducing port 14b for introducing outside air outside a passenger compartment, and an inside air introducing port 14c for introducing inside air inside the passenger compartment. The outside air introducing port 14b and the inside air introducing port 14c are opened and closed by an inside/outside air switching door 14a disposed inside the inside/outside air switching box 14. Thereby, outside air or inside air are switched and introduced inside the inside/outside air switching box 14. The inside/outside air switching door 14a is driven by an electric drive device 14e composed of a servomotor.

In a ventilating system of the air conditioning system, an air conditioning unit 15 arranged downstream of the blower 11 is, normally, disposed at a central position in a width direction of a vehicle inside of an instrument panel at a front section inside a passenger compartment, and the blower 11 is arranged in an offset position offset to a side of a front passenger seat from the air conditioning unit 15. A cold accumulator 40 and an air mixing door 19, which will be described later, are sequentially arranged inside the air conditioning case 10 at downstream air sides of the evaporator 9. A hot-water type heater core (heating heat exchanger) 20 for heating air by utilizing hot water (cooling water) from the vehicular engine 4 as a heat source is installed downstream of the air mixing door 19.

Further, at a sideward part (upward section in FIG. 1) of the hot-water type heater core 20, a bypass passage 21 through which air (cold air) from the evaporator 9 flows while bypassing the hot-water type heater core 20 is formed. The air mixing door 19 is rotatable door in a shape of a plate, and is driven by an electric drive device 22 composed of a servomotor.

The air mixing door 19 is a door for adjusting an air volume ratio between hot air passing through the hot-water type heater core 20 and cold air passing through the bypass passage 21, and adjusts the air temperature blown into the passenger compartment by adjusting the air volume ratio of cold air/hot air. In the present embodiment, the air mixing door 19 constitutes temperature adjusting means for air blown into the passenger compartment. A hot air passage 23 extending upward from a bottom side is formed downstream the hot-water type heater core 20. Air having a desirable temperature can be produced by mixing hot air from the hot air passage 23 and cold air from the bypass passage 21 at an air mixing section 24.

Further, inside the air conditioning case 10, an air outlet mode switching portion is constructed at a downstream side of the air mixing section 24. That is, a defroster opening section 25 is formed on an upper face section of the air conditioning case 10, and the defroster opening section 25 is provided for blowing air toward an inner surface of a windshield of a vehicle via a defroster duct (not illustrated). The defroster opening section 25 is opened and closed by a freely rotatable defroster door 26 formed into a plate like.

Further, in the upper face section of the air conditioning case 10, at a portion on a vehicle rearward side from the defroster opening section 25, a face opening section 27 is formed, and the face opening section 27 is provided for blowing air toward the upper half of a passenger within the passenger compartment via a face duct (not illustrated). The face opening section 27 is opened and closed by a freely rotatable face door 28 formed into a plate like.

Further, in the air conditioning case 10, a foot opening section 29 is formed at a lower side portion of the face opening section 27, and the foot opening section 29 is provided for blowing air toward the foot area of a passenger inside the passenger compartment. The foot opening section 29 is opened and closed by a freely rotatable foot door 30 formed into a plate like. The air outlet mode doors 26, 28, and 30 described above are connected to a common link mechanism (not illustrated), and are driven by an electric drive device 31 composed of a servomotor via the link mechanism.

An evaporator temperature sensor 32 is disposed at a portion directly after an air outlet of the evaporator 9 inside the air conditioning case 10, and detects an evaporator air temperature Te after immediately passing through the evaporator 9. Further, a cold accumulator temperature sensor 33 is arranged at a portion directly after an air outlet of the cold accumulator 40, and detects a cold accumulator air temperature Tc after immediately passing through the cold accumulator 40.

Here, the evaporator air temperature Te detected by the evaporator temperature sensor 32 is utilized for the intermittent control of the electromagnetic clutch 2 of the compressor 1. Further, in a case where the compressor 1 is a variable displacement type, the evaporator air temperature Te is utilized for a control the discharge displacement of the compressor 1. Further, the cooling capability of the evaporator 9 is adjusted by these clutch intermittent control or the control of the discharge displacement of the compressor 1. On the other hand, the cold accumulator air temperature Tc detected by the cold accumulator temperature sensor 33 is utilized for the control of an opening degree of the air mixing door 19.

In the meantime, both the temperature sensors 32 and 33 described above may be of types having substantially the same degree of temperature responsiveness. However, in order to restrain a fluctuation of the air temperature blown into the passenger compartment, in particular, it is better to elevate the temperature responsiveness of the cold accumulator temperature sensor 33.

In the air-conditioning electronic control unit 5 (A/C ECU), detection signals are inputted from both the temperature sensors 32 and 33 described above, and from a well known sensor group 35 for detecting an inside air temperature Tr, an outside air temperature Tam, an amount of solar radiation Ts, and a hot water temperature Tw and the like for the purpose of air conditioning control. Further, onto an air conditioning control panel 36 installed in the neighborhood of the instrument panel inside the passenger compartment, an operation switch group 37 for manual operation by a passenger is provided. Operation signals from the operation switch group 37 are also inputted to the air-conditioning electronic control unit 5.

The operation switch group 37 includes a temperature setting switch 37a for generating a temperature setting signal Tset, an air volume switch 37b for generating an air volume switching signal, an air outlet mode switch 37c for generating an air outlet mode signal, an inside/outside air changeover switch 37d for generating an inside/outside air switching signal, an air conditioning switch 37e for generating an on/off signal of the compressor 1, and the like. By a manual operation of the air outlet mode switch 37c, an air outlet mode is set among a face mode, a foot mode, a bi-level mode, a foot-defroster mode, and a defroster mode.

Further, the air-conditioning electronic control unit 5 is connected to an engine electronic control unit 38 (an engine ECU). Accordingly, from the engine electronic control unit 38 to the air-conditioning electronic control unit 5, a revolutionary speed signal of the vehicular engine 4, a vehicular speed signal, and the like are inputted.

The engine electronic control unit 38 is for systematically controlling a fuel injection amount and an ignition timing in the vehicular engine 4 on the basis of signals from a sensor group (not illustrated) for detecting an operation state or the like of the vehicular engine 4. Further, in an economically running vehicle or a hybrid vehicle, when a vehicular stoppage state is determined on the basis of a revolutionary speed signal of the vehicular engine 4, a vehicular speed signal, a brake signal or the like, the engine electronic control unit 38 automatically stops the vehicular engine 4 by a cutoff of an electronic source of an ignition device, a stoppage of fuel injection or the like.

Further, after a stoppage of the engine, when the vehicle is shifted from a vehicular stoppage state to a start state by an operation of a driver, the engine electronic control unit 38 determines the start state of the vehicle on the basis of an acceleration signal or the like, and automatically starts the vehicular engine 4. In addition, the air-conditioning electronic control unit 5 outputs an engine re-operation signal based on an increase of the cold accumulator air temperature Tc or the like, after the stoppage of the vehicular engine 4.

The air-conditioning electronic control unit 5 and the engine electronic control unit 38 are constructed of a well known microcomputer composed of a CPU, a ROM, a RAM, or the like, and their peripheral circuit. The air-conditioning electronic control unit 5 has an engine control signal output section for outputting signals of stop permission or stop prohibition of the vehicular engine 4 or a signal of the engine re-operation after the stoppage thereof, a compressor intermittent control section due to the electromagnetic clutch 2, an inside/outside air sucking control section due to the inside/outside air switching door 14a, an air volume control section of the blower 11, a temperature control section due to the air mixing door 19, an air outlet mode control section due to switching of blow outlets 25, 27, and 29, and the like.

Next, a structure of the cold accumulator 40 will be now described in detail. The cold accumulator 40 is formed to have the same front surface area as that of the evaporator 9 as being illustrated in FIG. 1, so that entire volume (entire volume of air flowing inside air conditioning case 10) of cold air after passing through the evaporator 9 passes through the cold accumulator 40. In this way, the cold accumulator 40 is constructed to have a thin thickness in an air flow direction A, inside the air conditioning case 10.

Figure 2:
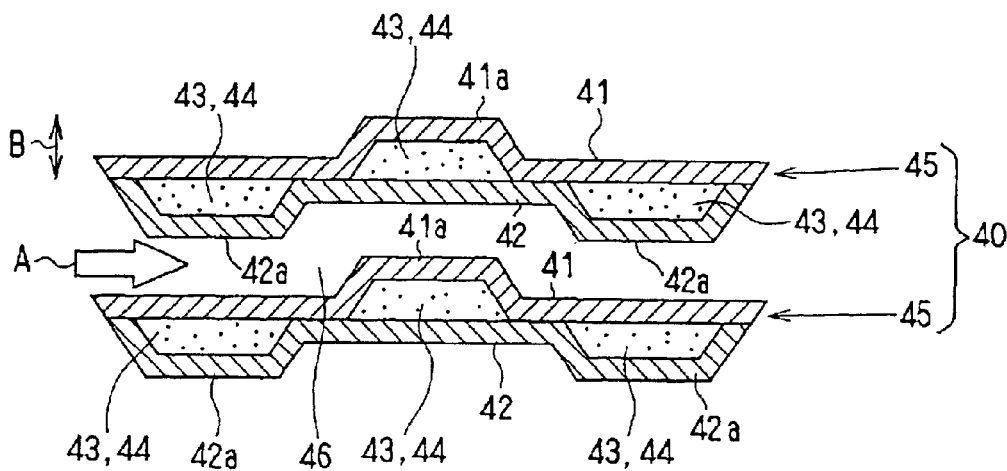
FIG. 2 is a sectional view showing a main part of a cold accumulator according to the first embodiment.

FIG. 2 illustrates a heat-exchanging structure of the cold accumulator 40, convex sections 41a and 42a (protrusions) are formed alternately along in an air (cold air) flow direction A, respectively, in two pieces of heat transfer plates 41 and 42. These convex sections 41a and 42a contact planar sections of the heat transfer plates 41 and 42 of mutually matching sides, respectively, to be bonded by brazing or the like. In this way, a tube 45 having hermetically closed spaces 43 on inner sides of the convex sections 41a and 42a is formed, and a cold accumulating material 44 is sealed to be accommodated inside the hermetically closed spaces 43.

In FIG. 2, a vertical direction (face-back direction) of a paper sheet surface is a vertical direction in an arrangement state of the cold accumulator 40 within the air conditioning case 10. Accordingly, the convex sections 41a and 42a of the heat transfer plates 41 and 42 and the hermetically closed spaces 43 inside thereof have shapes extending in a vertical direction inside the air conditioning case 10. Thus, condensed water generated on surfaces of the heat transfer plates 41 and 42 can be dropped downward by gravitational force along the convex sections 41a and 42a.

Further, only two sets of tubes 45 are illustrated in FIG. 2. However, actually, since the cold accumulator 40 has the same front surface area as that of the evaporator 9, plural sets of tubes 45 are laminated in a direction indicated by the arrow B (in a direction perpendicular to the air flow direction A) in FIG. 2.

At top and bottom both ends of the plural sets of the tubes 45, abutment sections contacting adjacent tubes are provided so that an air passage 46 with a predetermined interval is defined to be held between the tubes 45. Further, by integrally bonding (brazing) the heat transfer plates 41 and 42 of respective tubes 45 and the attachment sections of respective tubes 45 with each other, an entire portion of the cold accumulator 40 can be integrally formed as one heat-exchanging structure. In the cold accumulator 40, at the top and bottom both end sections of the tube 45, tanks (not illustrated) for communicating the plural hermetically closed spaces 43 are integrally formed, and the attachment sections described above can be constructed by these tanks.

Each of the heat transfer plates 41 and 42 is formed by a thin aluminum plate material, in consideration of a heat transfer property, weight lightening, and the like. Because a brazing temperature of aluminum is a high temperature in the vicinity of 600° C., the cold accumulating material 44 is sealed inside the hermetically closed spaces 43 after finishing a brazing process of the cold accumulator 40. In order to seal the cold accumulating material 44, in a part (for example, tanks described above or the like) of the hermetically closed spaces 43, one filling port or plural filling ports can be provided, so that the cold accumulating material 44 is filled inside the hermetically closed spaces 43 from these filling ports. The filling ports are sealed by lid members interposing an appropriate seal material (for example, O-ring or the like) after finishing this filling work.

The cold accumulating material 44, in order to prevent from being frosted over by the evaporator 9, should have a melting point in a range of 6–8° C., and the material should have a high corrosion preventive operation relative to a constituting quality of material (aluminum) of the cold accumulator 44. These conditions can be satisfied by paraffin, and paraffin is used as the cold accumulating material 44 in the first embodiment. Paraffin is superior to molten salt and the other inorganics even in aspects such as the chemical stability, the toxicity, and the cost.

Further, the air passage 46 forms a serpentine passage by projecting the convex sections 41a and 42a alternately. Accordingly, in the air passage 46, cold air, while flowing in the serpentine passage, directly contacts surfaces of the heat transfer plates 41 and 42 of respective tubes 45. According to this serpentine configuration, a coefficient of heat transmitting on an air side can be drastically improved by inhibiting a direct airflow and by disturbing the airflow. Even in a finless constitution that has no fin member on the air side, the required heat transmitting performance can be obtained.

Next, operation of the vehicle air conditioning system according to the first embodiment will be explained. In the vehicle air conditioning system, the refrigerating cycle R is operated by driving the compressor 1 by the vehicular engine 4, and a temperature of the evaporator 9 is maintained at a temperature in the vicinity of 3° C.–5° C. by the intermittent control of the operation of the compressor 1, so that the evaporator 9 is prevented from being frosted.

In the evaporator 9, a gas-liquid two phase refrigerant with a low temperature and allow pressure decompressed by the expansion valve 8 absorbs heat from air blown by the blower 11 and is evaporated, so that air is cooled in the evaporator 9 and the air blown from the evaporator 9 becomes cold air. Cold air from the evaporator 9, next, passes through the air passages 46 at the predetermined intervals, formed between the plural sets of the tubes 45 of the cold accumulator 40.

Because the heat-transmitting coefficient on the air side can be greatly improved by disturbing a cold air flow in the serpentine configuration of the air passages 46, while cold air passes through the air passages 46, the cold accumulating material (paraffin) 44 can be effectively cooled via the heat transfer plates 41 and 42. As a result, the cold accumulating material 44 is cooled and solidified from a liquid phase state at a normal room temperature to a solid phase, and cold accumulation can be performed in the configuration of latent heat of fusion.

Thus, in an economically running vehicle that automatically stops the engine 4 with the stoppage of the vehicle (when no engine power is required), such as in waiting for a change of a traffic signal, even if the compressor 1 of the refrigerating cycle R stops at the time of stoppage of the vehicle, the air temperature blown into the passenger compartment can be maintained comparatively in a low temperature state by utilizing a cold accumulating amount of the cold accumulating material (paraffin) 44. During cooling in a summer period, an abrupt increase in the air temperature blown into the passenger compartment, due to the stoppage of the compressor 1, can be restrained, and worsening of a cooling feeling can be prevented.

According to the first embodiment, because the cold accumulator 40 is disposed at a downstream air side of the evaporator 9 and at an upstream air side of the air mixing door 19, the cold accumulator 40 can be excellently cooled by cold air after passing through the evaporator 9 without being influenced by a rotation position of the air mixing door 19.

In particular, because the cold accumulator 40 has a structure cooled by cold air and the cold accumulator 40 is constituted by a finless structure, the cold accumulator 40 can be constructed to have a simple heat-exchanging structure. Further, when the cold accumulator 40 has the finless structure, an accommodation space of the cold accumulating material can be enlarged inside the same constitution, and cold accumulation capability can be increased.

As a specific example of the cold accumulating material 44, in a case where the cold accumulating material 44, utilizing 300 cc of paraffin having the melting point of 8, in the cold accumulator 40 in FIG. 2 is cooled by cold air at a temperature of 3–5 after passing through the evaporator 9, the cold accumulation (solidification) of the cold accumulating material 44 can be completed in about one minute. On the other hand, even in a stoppage state of the engine 4 (compressor 1), the passenger compartment can be sufficiently cooled for about one minute by 300 cc of the cold accumulating material 44 in which the cold accumulation has been completed.

(Second Embodiment)

In the above-described first embodiment, the cold accumulator 40 is constituted by a finless structure. However, in the second embodiment, as illustrated in FIG. 3, a cold accumulator 40 is constituted to have a fin and tube type heat-exchanging structure.

Figure 3:
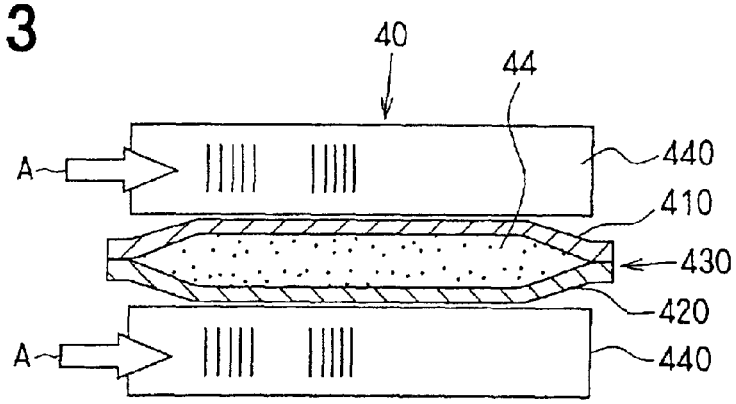
FIG. 3 is a sectional view showing a main part of a cold accumulator according to a second preferred embodiment of the present invention.

As shown in FIG. 3, two pieces of heat transfer plates 410 and 420 are molded into a shape swelled out in a bowl shape respectively to an outward direction. By bonding the two pieces of the heat transfer plates 410 and 420 in a hollow shape, a tube 430 can be formed. Further, corrugate type fins 440 folded and bent in a wave shape and the tubes 430 are alternately stacked on each other in the vertical direction in FIG. 3. The portions between the heat transfer plates 410 and 420 of each tube 430 and the portions between each fin 440 and each tube 430 are bonded with each other by brazing of aluminum. After the brazing, the cold accumulating material 44 is filled and hermetically sealed in an inner section space of each tube 430.

In the above-described first and the second embodiments, the heat transfer plates 41, 42, 410, and 420 are formed by respectively separate thin plate materials. However, one piece of thin plate material having a magnitude equivalent to two pieces of the heat transfer plates is bent in a U-shape at a central section thereof, and the tube 45 of the first embodiment or the tube 43 of the second embodiment may well be molded.

(Third Embodiment)

Figure 4:
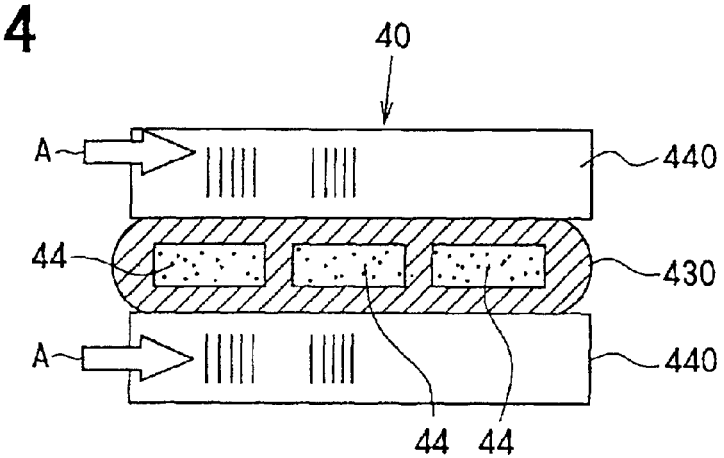
FIG. 4 is a sectional view showing a main part of a cold accumulator according to a third preferred embodiment of the present invention.

In the second embodiment described above, the tube 430 is constituted by bonding the heat transfer plates 410 and 420 composed of a press molded thin plate material. However, in the third embodiment, as illustrated in FIG. 4, a tube 430 is formed by an extrusion to have a sectional shape of a porous form, and the extruded tubes 430 and the corrugate type fins 440 are bonded alternately. In this case, a cold accumulating material 44 is filled and hermetically sealed in a porous inner section of the tubes 430.

(Fourth Embodiment)

Figure 5:
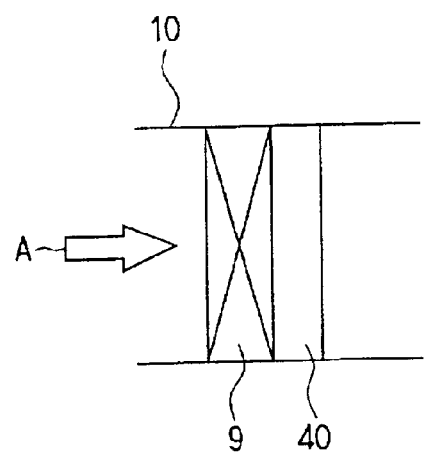
FIG. 5 is a sectional view showing an integrally disposed cold accumulator and evaporator according to a fourth preferred embodiment of the present invention
Figure 6:
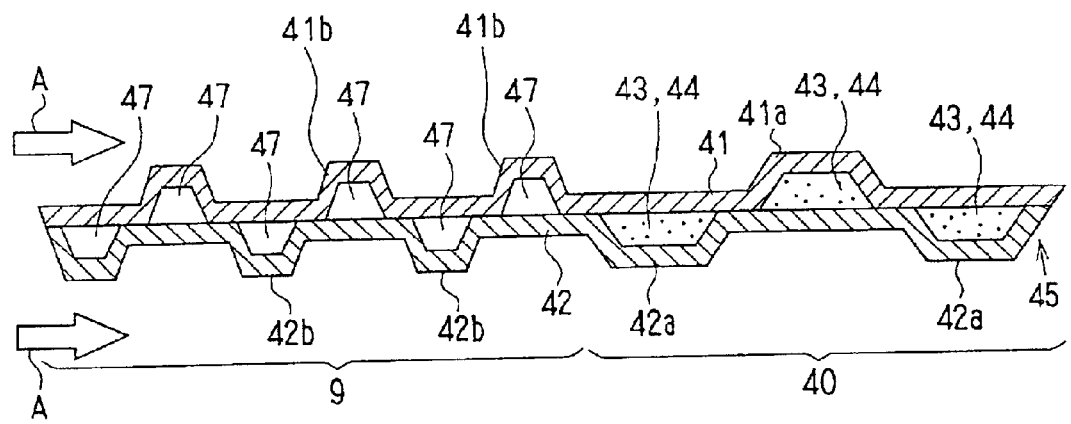
FIG. 6 is a sectional view showing an integrated structure of the cold accumulator and the evaporator according to the fourth embodiment.

In the first embodiment described above, the cold accumulator 40 separated from the evaporator 9 is arranged downstream the evaporator 9. However, in the fourth embodiment, as illustrated in FIG. 5, the evaporator 9 and the cold accumulator 40 are integrally formed with each other. FIG. 6 illustrates a specific example in which the evaporator 9 and the cold accumulator 40 are integrally formed with each other. In FIG. 6, both the evaporator 9 and the cold accumulator 40 are integrally formed with each other in a finless structure.

In FIG. 6, hermetically closed spaces 43 for accommodating a cold accumulating material 44 is formed by molding the convex sections 41a and 42a similar to that of in FIG. 2, at a downstream air side position in an air flow direction A of the heat transfer plates 41 and 42. Further, among the heat transfer plates 41 and 42, at an upstream air side position in the air flow direction A, convex sections 41b and 42b are also molded, so that refrigerant passages 47 through which a refrigerant of the evaporator 9 flows are formed inside the convex sections 41b and 42b.

According to the fourth embodiment, the upstream evaporator 9 and the downstream cold accumulator 40 in the air flow direction A can be simply manufactured by integral brazing, further, the evaporator 9 and the cold accumulator 40 can be brought together in a lump as one heat-exchanging structure. Therefore, the integrated structure of both the evaporator 9 and the cold accumulator 40 can be easily mounted to inside the air conditioning case 10. Further, because the cold accumulating material 44 can be cooled by cold air cooled by the refrigerant in the refrigerant passage 47, at the same time, the cold accumulating material 44 can be cooled by heat conduction via the heat transfer plates 41 and 42, a cooling effect of the cold accumulating material 44 can be improved.

(Fifth Embodiment)

Figure 7:
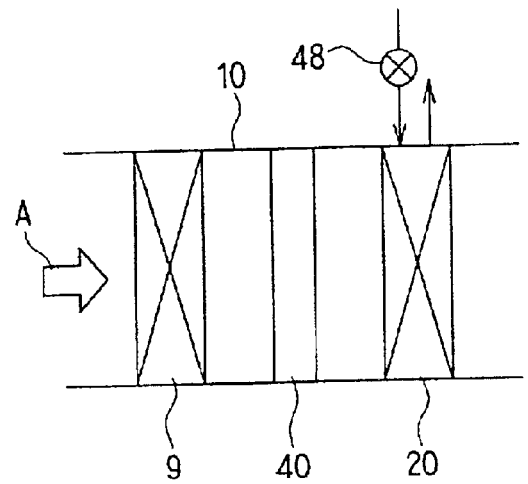
FIG. 7 is a schematic sectional view showing an arrangement position relationship between an evaporator, a heater core and a cold accumulator, according to a fifth preferred embodiment of the present invention.

In the first embodiment described above, the cold accumulator 40 is disposed at a downstream air side of the evaporator 9 and at an upstream air side of the air mixing door 19. However, in a fifth embodiment, as illustrated in FIG. 7, the cold accumulator 40 is arranged downstream of the evaporator 9, further, upstream a heater core 20 in the air flow direction A.

That is, in the fifth embodiment, a hot water valve 48 for adjusting a hot water flow rate (or hot water temperature) of the heater core 20 is provided in a hot water circuit. By adjusting the hot water flow rate (or hot water temperature) of the heater core 20 with adjustment of an opening degree of the hot water valve 48, heating capability of the heater core 20 can be adjusted.

Since the temperature adjusting mean for adjusting the air temperature blown into passenger compartment can be carried out by the hot water valve 48, the air mixing door 19 described in the first embodiment becomes unnecessary.

(Sixth Embodiment)

Figure 8:
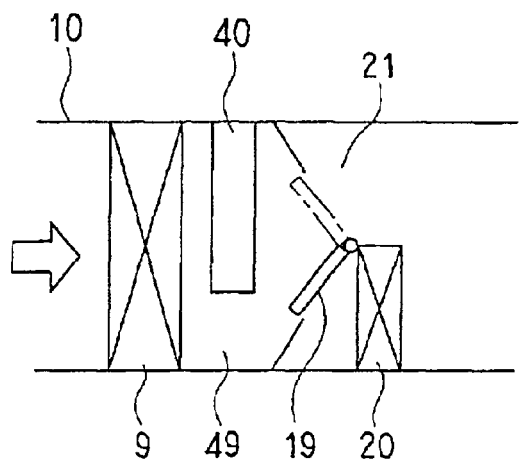
FIG. 8 is a schematic sectional view showing an arrangement position relationship between an evaporator, a heater core and a cold accumulator, according to a sixth preferred embodiment of the present invention.

In the first embodiment described above, the front surface area of the cold accumulator 40 is the same as that of the evaporator 9, so that the entire volume of cold air after passing through the evaporator 9 passes through the cold accumulator 40. However, in the sixth embodiment, as illustrated in FIG. 8, the front surface area of the cold accumulator 40 is made smaller than that of the evaporator 9, so that a bypass passage 49 of the cold accumulator 40 is formed. Therefore, the entire volume of cold air after passing through the evaporator 9 does not pass through the cold accumulator 40, but a part of cold air bypasses the cold accumulator 40.

(Seventh Embodiment)

Figure 9:
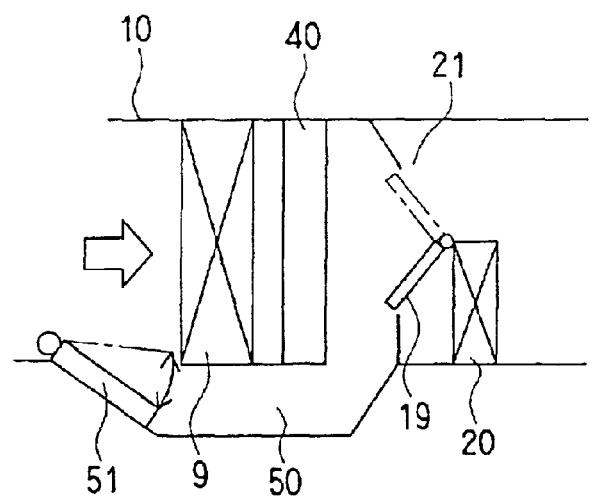
FIG. 9 is a schematic sectional view showing an arrangement position relationship between an evaporator, a heater core and a cold accumulator, according to a seventh preferred embodiment of the present invention.

In the above-described first through sixth embodiments, the front surface area of the evaporator 9 is made the same as a passage sectional area inside the air conditioning case 10 so that an entire volume of air blown by the blower 11 passes through the evaporator 9. However, in the seventh embodiment, as illustrated in FIG. 9, the front surface areas of the evaporator 9 and the cold accumulator 40 are made identical with each other, a bypass passage 50 through which air bypasses the evaporator 9 and the cold accumulator 40 is formed inside the air conditioning case 10, and a plate-like bypass door 51 is rotatably arranged in an inlet section of the bypass passage 50. The bypass door 51 adjusts an opening degree of the bypass passage 50 to adjust an air volume bypassing the evaporator 9.

According to the seventh embodiment, a reduction effect (power saving effect) of the compressor driving power can be exhibited from the following reasons. That is, in order to solidify the cold accumulating material 44 inside the cold accumulator 40, the temperature of the evaporator 9 is invariably necessitated to be lowered at a temperature equal to or below a melting point of the cold accumulating material 44. On the other hand, when a cooling load is small such as in an intermediate period of the spring or the autumn, there is a case where the temperature of the evaporator 9 may well not be lowered to the temperature equal to or below the melting point of the cold accumulating material 44.

Thus, in the seventh embodiment, when the temperature of the evaporator 9 is not lowered to a temperature equal to or below the melting point of the cold accumulating material 44 such as the intermediate period, the bypass passage 50 is opened by the bypass door 51, so that a part of air blown by the blower 11 flows through the bypass passage 50 while bypassing the evaporator 9 and the cold accumulator 40. In this case, cold air having a temperature equal to or lower than the melting point of the cold accumulating material 44 passes through the evaporator 9 and the cold accumulator 40 and is mixed with a bypass air (sucking air of evaporator) not cooled by the evaporator 9 and having a high temperature, so that a target air temperature can be obtained.

Specifically, an opening degree of the bypass door 51 can be set based on the air temperature Tc from the cold accumulator 40 detected by the temperature sensor 33, the temperature of bypass air (sucking air of evaporator) passing through the bypass passage 50 and the target air temperature blown into the passenger compartment. In the meantime, since bypass air (sucking air of evaporator) is inside air or outside air, the temperature of bypass air can be obtained on the basis of the inside air temperature Tr or the outside air temperature Tam detected by the sensor group 35.

As described above, a decrease in the cooling load of the evaporator 9 can be performed by a reduction in the air volume passing through the evaporator 9. Accordingly, a rate of operation of the compressor 1 is reduced, and a decrease in the compressor driving power can be realized.

(Eighth Embodiment)

Figure 10:
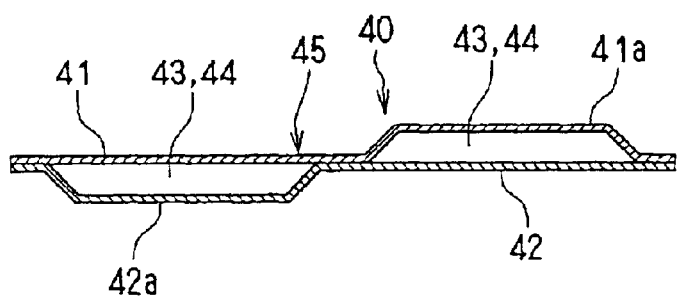
FIG. 10 is a sectional view showing a part of a cold accumulator according to a comparison example of an eighth preferred embodiment.
Figure 11:
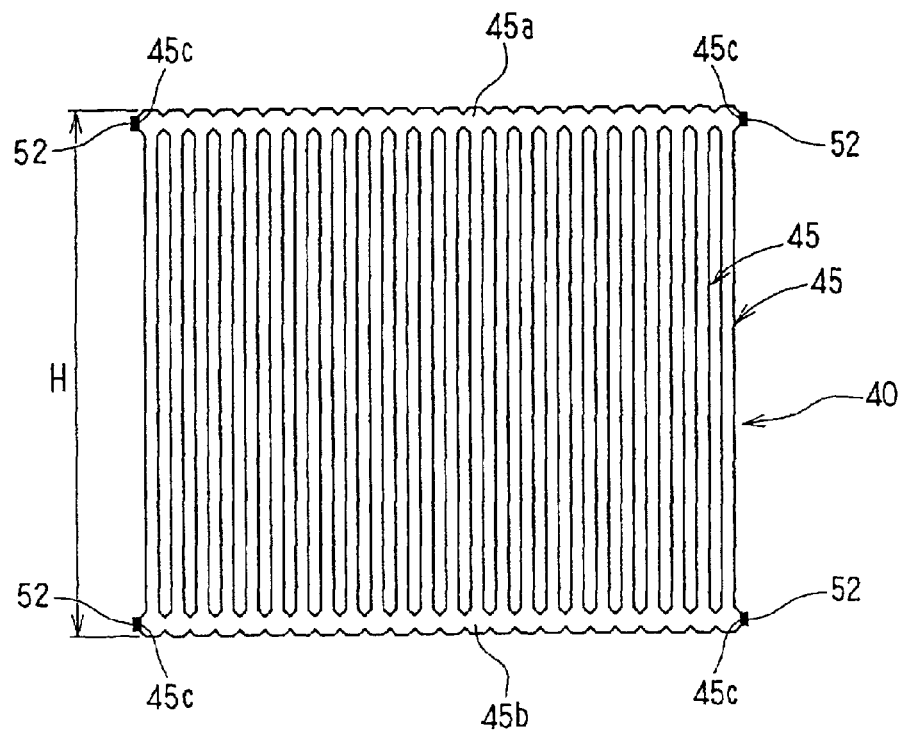
FIG. 11 is a schematic sectional view showing the cold accumulator according to the comparison example.

An object of the eighth embodiment is to obtain a cold accumulator structure which can reduce manufacturing cost while maintaining performance of cold accumulation and cold discharging. FIGS. 10 and 11 show a comparison example of the eighth embodiment. FIG. 10 shows a sectional view of the tube 45 corresponding to that of in FIG. 2, and FIG. 11 shows an entire sectional view of the cold accumulator 40 which is obtained by laminating and brazing the tubes 45 in FIG. 10 in a lateral direction. In this case, as shown in FIG. 11, tank sections 45a and 45b are formed at top and bottom end sections of the tubes 45, filling ports 45c of the cold accumulating material 44 are provided at both lateral end sections of the respective tank sections 45a and 45b, and the filling ports 45c are sealed by lid members 52 after the cold accumulating material 44 are filled from the filling ports.

With the construction of the cold accumulator shown in FIGS. 10 and 11, the cold accumulator 40 is constituted by press molding the heat transfer plates 41 and 42, and laminating and brazing the heat transfer plates 41 and 42. Accordingly, at every change of a height dimension H of the cold accumulator 40 due to a change in a vehicular type, it is necessary to change the press molded dimensions of the heat transfer plates 41 and 42. Therefore, it is necessary to prepare a press die corresponding to respective press molding dimensions, and cost of a press die per one cold accumulator becomes expensive.

Further, since a brazing process is required in the laminated assembly of the heat transfer plates 41 and 42, as assembly jigs for holding an assembly state of the laminated assembly, the jig of multi kind of dimensions are required. Further, a brazing furnace is also required as the manufacturing equipment, and the cost of equipment becomes expensive.

Figure 12:
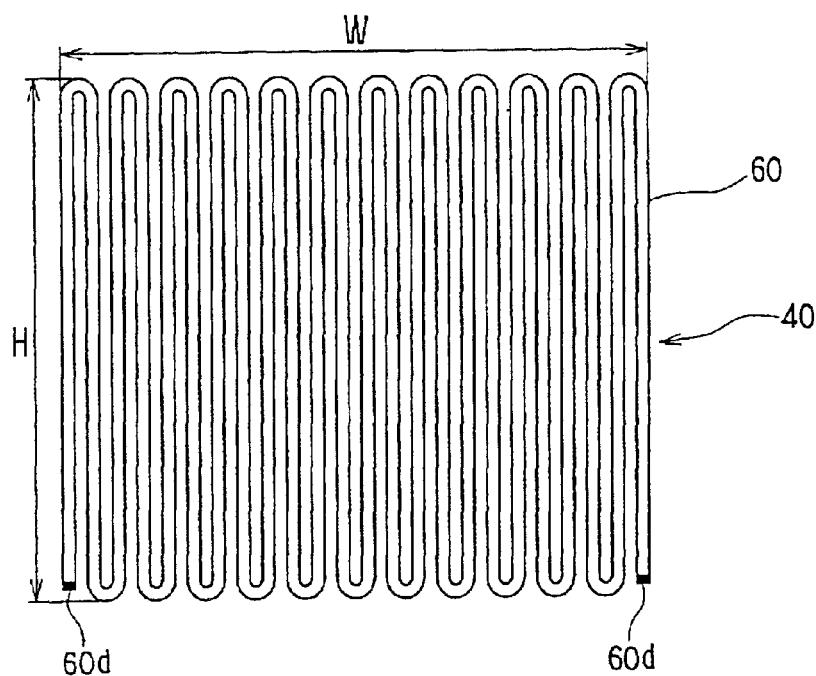
FIG. 12 is a front view showing a cold accumulator according to the eighth embodiment.

Contrary to that, FIG. 12 illustrates a cold accumulator 40 according to the eighth embodiment. In the eight embodiment, a tube of the cold accumulator 40 is not formed by a laminated structure of the press molded heat transfer plates 41 and 42, but is constituted by folding and bending a tube 60 having various sectional shapes in a flattened form as illustrated in FIGS. 13A–13E.

Figure 13A:
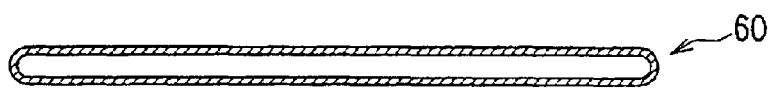
FIGS. 13A–13E are sectional views each showing a tube used in the cold accumulator according to the eighth embodiment.
Figure 13B:
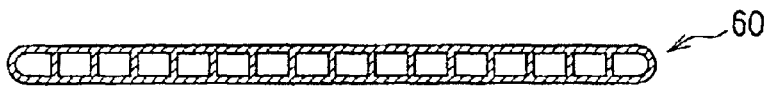
Figure 13C:
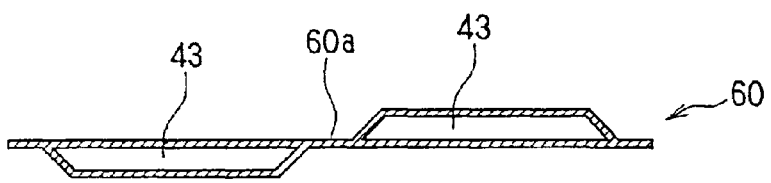

Specifically, FIG. 13A-FIG. 13C respectively illustrate a tube 60 formed by extrusion (or drawing) of aluminum. The tube 60 illustrated in FIG. 13A is a tube formed into a single hole shape of a flattened form. The tube 60 illustrated in FIG. 13B is a tube formed into a porous shape in a flattened form. The tube 60 illustrated in FIG. 13C has the sectional shape similar to that illustrated in FIG. 10, that is, hermetically sealed spaces 43 are projected from a central wall section 60a to both sides of an obverse/reverse. But, in FIG. 13C, the flattened sectional shape of the tube 60 is formed by extrusion (or drawing) of aluminum.

Figure 13D:
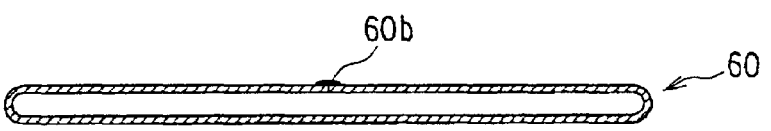
Figure 13E:
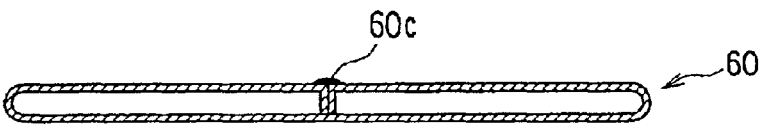

Next, the tube 60 illustrated in FIG. 13D is a tube formed into a flattened form of the single hole shape similar to that of in FIG. 13A. However, in FIG. 13D, a thin plate material of aluminum is folded and bent, and thereafter, a butted end face of the thin plate material of aluminum is melted to have a welded section 60b. Next, the tube 60 illustrated in FIG. 13E, is a tube formed into a flattened shape with two holes. The tube 60 shown in FIG. 13E is formed by folding and bending a thin plate material of aluminum and by melting a butted end face of the thin plate material of aluminum. Numeral 60c denotes the welded section. Because the flattened sectional shape of the tube 60 is formed in parallel with a flow direction (lateral direction in FIG. 13) of cold air after passing through the evaporator 9, pressure loss on an air side can be restricted.

Further, in the eighth embodiment, the cold accumulator 60 is completed by folding and bending each of various tubes 60 described above in a serpentine shape as illustrated in FIG. 12. In the tube sectional shapes of the tubes 60 illustrated in FIG. 13A-FIG. 13E, since a wall thickness of each tube 60 is set in a thin wall of a degree of 0.2–0.5 mm, the folding and bending of each tube 60 can be readily performed.

In the cold accumulator 40 illustrated in FIG. 12, after an entire shape of the cold accumulator 40 is constituted by folding and bending one piece of tube 60, from opening sections (filling port) at both ends of the tube 60, the cold accumulating material 44 is filled into an inner space of the tube 60, and the opening sections at both the ends of the tube 60 are hermetically sealed. In the eighth embodiment, as the cold accumulating material 44, paraffin having a melting point at 8° C. is utilized. Numeral 60d denotes hermetically sealing sections of both the ends of the tube 60, and specific examples of this hermetically sealing sections 60d are illustrated in FIG. 14A-FIG. 14C.

Figure 14A:
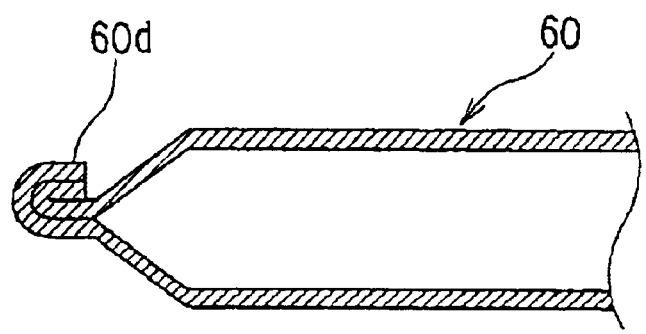
FIGS. 14A–14C are sectional views each showing a sealing structure of a tube end in the accumulator according to the eighth embodiment.
Figure 14B:
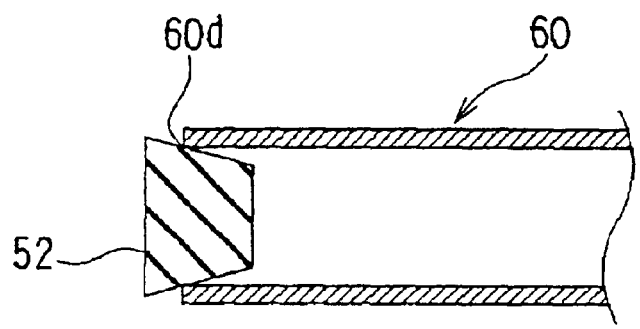
Figure 14C:
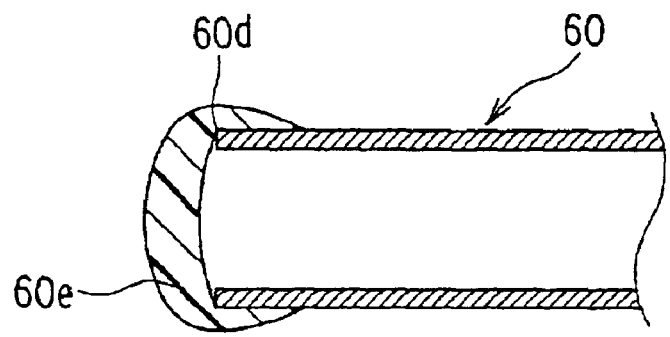

That is, the hermetically sealing section 60d illustrated in FIG. 14A is hermetically sealed by folding and bending the opening section of an end section of the tube 60. In the hermetically sealing section 60d illustrated in FIG. 14B, a lid member 52 having a seal function by an elastic material is press-fitted into an opening section of an end section of the tube 60, to hermetically seal the tube opening section. In the hermetically sealed section 60d illustrated in FIG. 14C, the opening section of an end section of the tube 60 is hermetically sealed by an adhesive material 60e.

According to the eighth embodiment, the entire shape of the cold accumulator 40 can be formed into the serpentine shape by folding and bending the tube 60 having an optional length with a predetermined frequency. Accordingly, a width W of the cold accumulator 40 can be optionally adjusted by a folding and bending frequency of the tube 60, further, a height H of the cold accumulator 40 can be also optionally adjusted by a folding and bending dimension of the tube 60.

Thus, in the eighth embodiment, there is no need for press-forming the heat transfer plates 41 and 42 by an exclusive press die for every size of the cold accumulator 40, and a brazing process is also not required.

Further, because the opening section of the end of the tube 60 can be utilized as a filling port of the cold accumulating material 44, it is only necessary to hermetically seal the opening section of the end of the tube 60 after filled filling with the cold accumulating material 44. Therefore, the structure of the cold accumulator 40 can be made simple.

(Ninth Embodiment)

Figure 15:
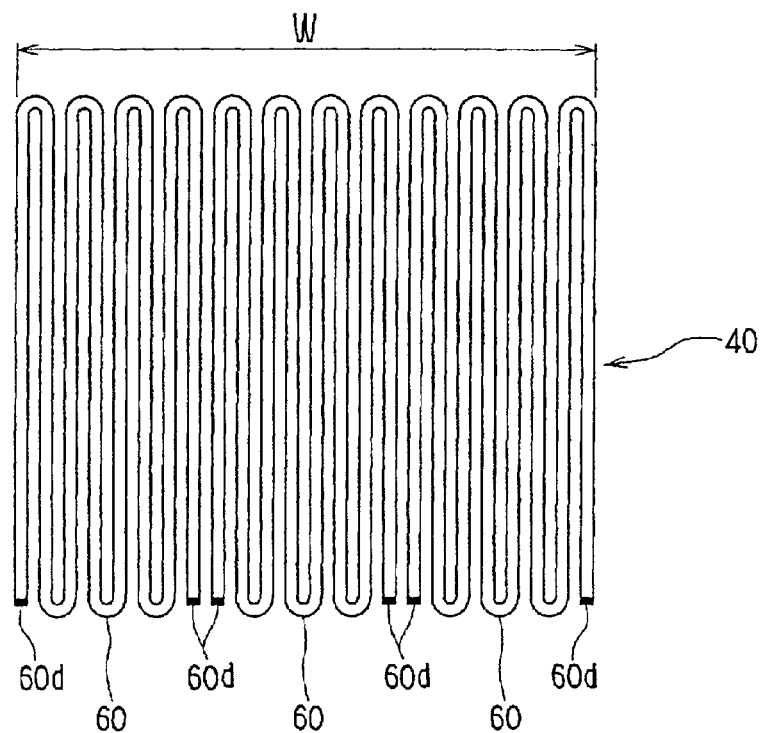
FIG. 15 is a front view showing a cold accumulator according to a ninth preferred embodiment of the present invention.

FIG. 15 illustrates the ninth embodiment of the present invention. In the eighth embodiment described above, since the cold accumulator 40 is constituted by folding and bending one piece of tube 60, there is a case where a required length of the tube 60 becomes excessive. In such a case, in the ninth embodiment, the entire shape of the cold accumulator 40 is constituted by dividing the folded and bent structural body (serpentine structural body) in a serpentine shape of the tube 60 into a plurality of pieces (in FIG. 15, three pieces) in a width direction W of the cold accumulator 40. Accordingly, it can prevent the length of one piece of the tube 60 from being excessively longer.

(Tenth Embodiment)

Figure 16:
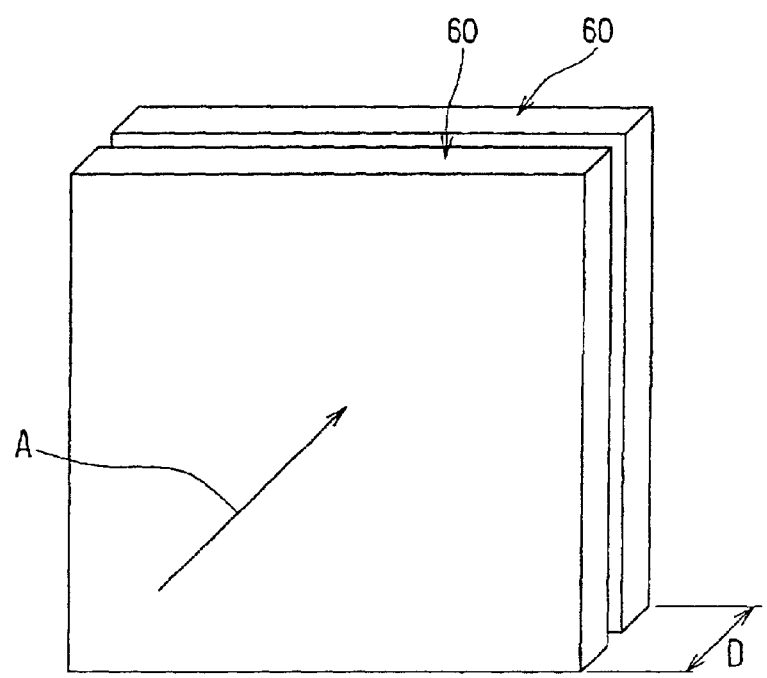
FIG. 16 is a perspective view showing a cold accumulator according to a tenth preferred embodiment of the present invention.
Figure 17A:
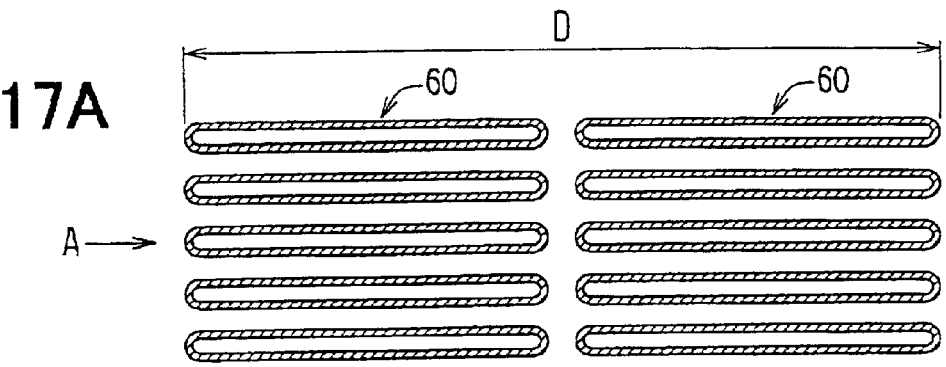
FIGS. 17A and 17B are sectional views each showing a tube arrangement state of the cold accumulator according to the tenth embodiment.
Figure 17B:
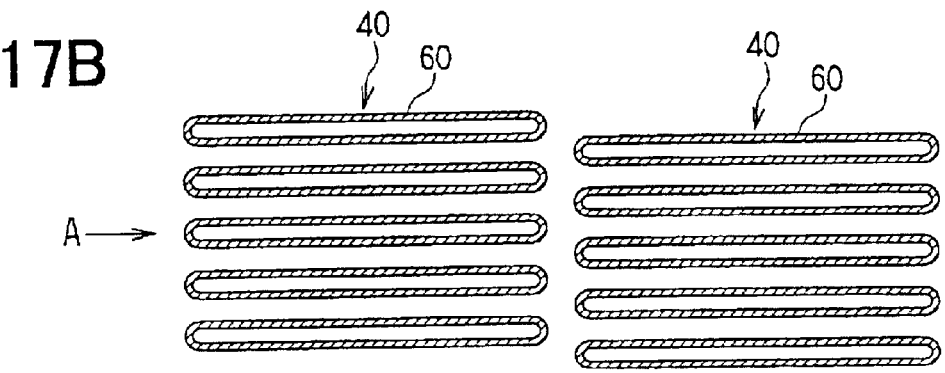

FIG. 16 and FIGS. 17A and 17B illustrate the tenth embodiment of the present invention. In the tenth embodiment, a folded and bent structural body (serpentine structural body) in a serpentine shape of the tube 60 is divided into plural pieces (in FIG. 16, two pieces) in a thickness direction D (in other words, air flow direction A) of the cold accumulator 40.

When the folded and bent structural body of the tube 60 is divided into plural pieces in the thickness direction D (air flow direction A) described above, a tube pitch at an upstream side and a tube pitch at a downstream side in an air flow direction A are coincided with each other as illustrated in FIG. 17A. Alternatively, as illustrated in FIG. 17B, a tube pitch may be devised to be deviated between the upstream and downstream air sides. When the tube pitch is deviated as illustrated in FIG. 17B, a heat-exchanging efficiency of the downstream tube 60 in the air flow direction A can be improved by a tip effect.

The plural tube folded and bent structural bodies in the width direction W of the cold accumulator 40 in the above-described ninth embodiment, and the plural tube folded and bent structural bodies in the air flow direction A in the tenth embodiment can be integrally coupled with each other respectively with the use of mounting brackets (not illustrated). In this case, the entire cold accumulator 40 can be incorporated inside the air conditioning case 10 as an integral structure.

(Eleventh Embodiment)

Figure 18:
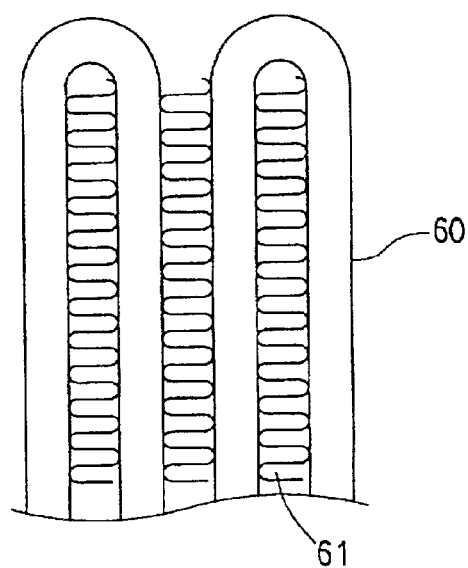
FIG. 18 is a front view showing a part of a cold accumulator according to an eleventh preferred embodiment of the present invention.

FIG. 18 illustrates the eleventh embodiment of the present invention. In the eleventh embodiment, between the tubes 60 constructing the cold accumulator 40, corrugate fins 61 similar to the corrugate fins 440 illustrated in FIG. 3 and 4 are inserted to improve the heat-exchanging efficiency between cold air after passing through an evaporator 9 and the cold accumulator 40. The corrugate fins 61 of the eleventh embodiment are press-contacted on outer surfaces of the tubes 60, and a brazing between the tube 60 and the corrugate fin 61 is unnecessary in the eleventh embodiment.

(Twelfth Embodiment)

In the above-described eighth through eleventh embodiments illustrated in FIG. 12-FIG. 18, the cold accumulator 40 is constructed by the folded and bent structural body folded and bent in a serpentine shape by prescribed frequencies. However, in the twelfth embodiment, the cold accumulator 40 is constructed by utilizing straight tubes 60 without folding or bending in the serpentine shape, as illustrated in FIG. 19.

Figure 19:
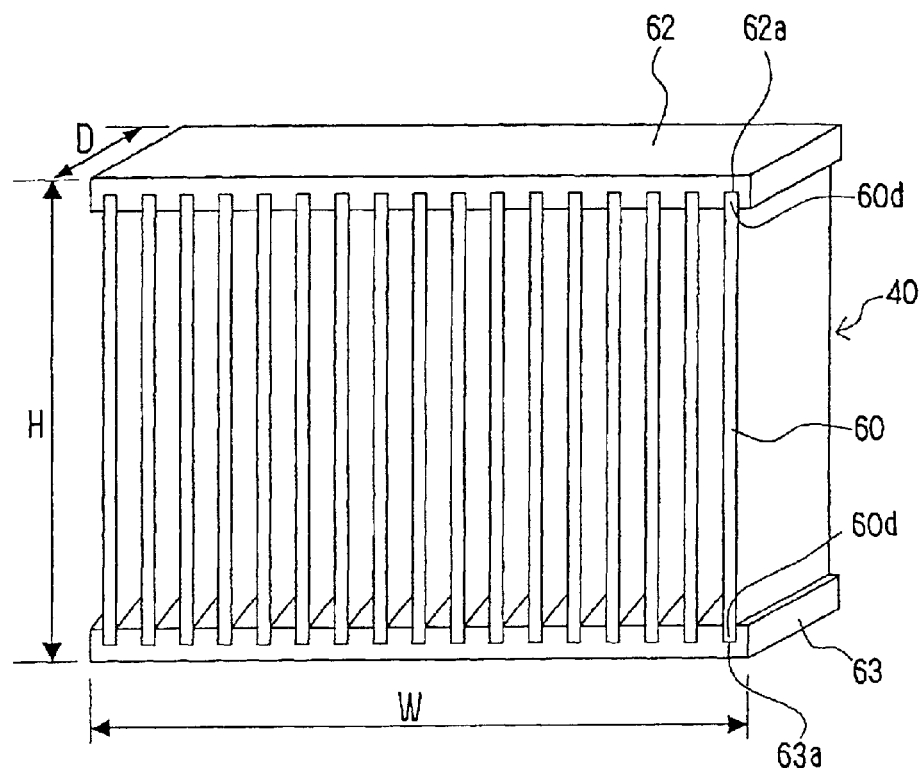
FIG. 19 is a perspective view showing a cold accumulator according to a twelfth preferred embodiment of the present invention.

FIG. 19 shows a perspective view showing the cold accumulator 40 according to the twelfth embodiment. As shown in FIG. 19, the cold accumulator 40 includes a plurality of tubes 60 extending straight in a vertical direction, and fixing members 62 and 63 for fixing longitudinal both ends of the tubes 60.

The tubes 60 are the metallic tubes made of aluminum or the like having various cross sectional shapes of a flattened form as illustrated in FIG. 13A–13E as described above, the tubes 60 formed into the various sectional shapes are cut in a predetermined length, and a cold accumulating material 44 is hermetically sealed in an inner section of respective tubes 60. Here, as the cold accumulating material 44, in the present embodiment, paraffin having a melting point at 8° C. is utilized. Numerals 60d denote the hermetically sealing sections at both ends of each tube 60. For example, the hermetically sealing section 60d may have the same structure as the structure illustrated in each of FIGS. 14A–14C.

The fixing members 62 and 63 are normally made of resin, and a plurality of groove sections 62a and 63a are provided respectively at predetermined intervals in a longitudinal direction of both the fixing members 62 and 63. Further, both the top and bottom end sections of each tube 60 are press-fitted into the groove sections 62a and 63a, respectively, so that the tubes 60 are fixed to the fixing members 62 and 63. In the twelfth embodiment, both the fixing members 62 and 63 may be made of a metal such as aluminum.

According to the twelfth embodiment, the height H of the cold accumulator 40 can be adjusted to an optional length by a change in a cutting length of the tube 60. Further, the width W of the cold accumulator 40 can be adjusted to an optional dimension by a change in the number of laminated steps of the tubes 60. Accordingly, operation for press-forming the heat transfer plates 41 and 42 by an exclusive press die for every size of the cold accumulator 40 is eliminated, and a brazing process is not required. Thus, the cold accumulator 40 can be manufactured in low cost.

Further, the end opening sections of the tubes 60 can be utilized as filling ports of the cold accumulating material 44, and are only needed for hermetically sealing the end opening sections of the tubes 60 after the tubes 60 are filled with the cold accumulating material 44. Therefore, the hermetically sealing structure of the cold accumulating material 44 can be made simple.

In the twelfth embodiment, fins are not provided between respective tubes 60 of the cold accumulator 40, however, the corrugate fins 61 insulated in FIG. 18 of the eleventh embodiment can be inserted between respective tubes 60. In this case, the heat-exchanging efficiency can be improved in the cold accumulator 40.

As a modified example of the twelfth embodiment, the tube 60 sealed with the cold accumulating material 44 may be integrally formed by an insert molding while the fixing members 62 and 63 are molded by a resin. That is, the required number of tubes 60 filled with the cold accumulating material 44 are arranged in a predetermined pitch inside a molding die, after both the end sections of the tubes 60 are sealed. Thereafter, each of the fixing members 62 and 63 may be integrally molded by a resin with the tubes 60 around the end sections of the tubes 60.

As an another modified example of the twelfth embodiment, the fixing members 62 and 63 are eliminated. In this case, the required number of the tubes 60 filled with the cold accumulating material 44 and hermetically sealed both the end sections are arranged in a predetermined pitch by an appropriate jig, and thereafter, the end sections of respective tubes 60 are mutually connected to an integral structure by an adhesive material or the like.

Further, as an another modified example of the twelfth embodiment, firstly, one side opened ends of the tubes 60 are hermetically sealed in the tubes 60 each of which has both opened ends, next, the cold accumulating material 44 is filled from the other side opened ends of the tubes 60 into respective tubes 60, and thereafter, the other side opened ends of the tubes 60 may be hermetically sealed. Here, hermetical sealing of the opened end section of the tube 60 can be performed by utilizing various means illustrated in FIGS. 14A–14C. In this case, the hermetical sealing of the opened end section of each tube 60 and the connection between the required number of the tubes 60 may be performed together at one time.

(Thirteenth Embodiment)

A thirteenth embodiment is contrived to decrease driving power of a compressor of a refrigerating cycle while securing a required cold accumulating amount relative to an air conditioning heat load.

When one kind of a cold accumulating material 44 is sealed inside a cold accumulator 40 as described in the first through twelfth embodiments, the state of the cold accumulating material, such as a melting point of the cold accumulating material 44 and a sealing amount of the cold accumulating material 44, are set so that the required cold accumulating performance is satisfied in an air-conditioning heat load condition in a summer period. For example, in the condition of the summer, in order to maintain in a predetermined cooling state during one minute inside a passenger compartment by a cold discharging operation of the cold accumulator 40 at time of a stoppage of the engine 4 (compressor 1) accompanied with a vehicle stoppage such as in waiting for a change of a traffic signal, 300 cc of paraffin having a melting point at 8° C. is required as the cold accumulating material 44. In order to perform cold accumulation by solidifying (freezing) paraffin having the melting point at 8° C., an air temperature blown from the evaporator 9 is required to be set in a degree of 3° C.

When the air conditioning heat load is lowered such as in an intermediate period of the spring and the autumn, there is generated a case where a target temperature of air blown from the evaporator 9 can be elevated to a temperature of 10° C., for example, based on the air conditioning heat load.

When the cold accumulating material 44 inside the cold accumulator 40 is only one kind of paraffin having a melting point at 8° C., even in an intermediate period of the spring and the autumn, it is necessary to set the air temperature of the evaporator 9 at a low temperature of 3° C. for the purpose of the cold accumulation. As a result, a cooling capability of the evaporator 9 in the intermediate period is increased more than necessary, and the driving power of the compressor is increased.

Figure 20:
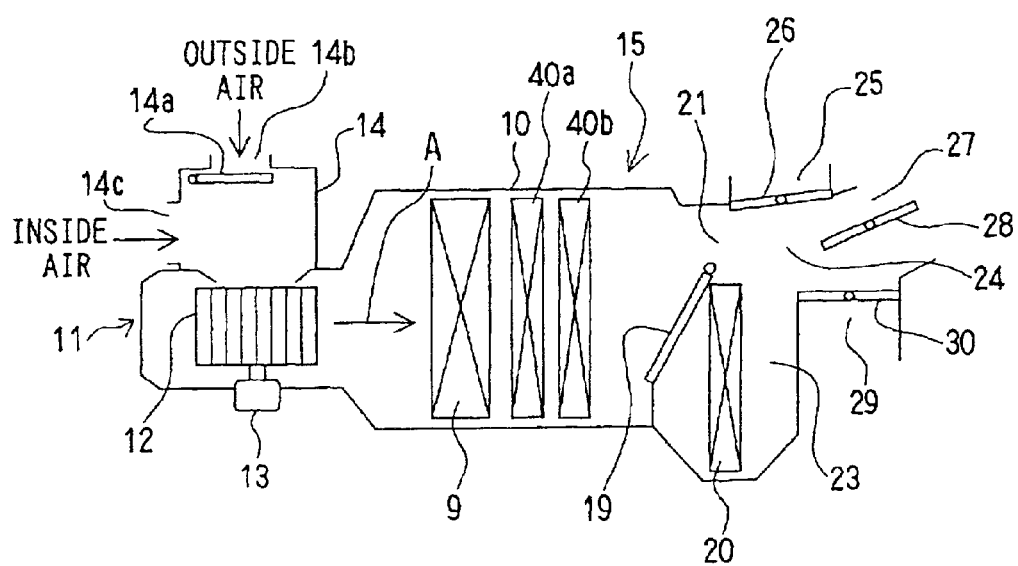
FIG. 20 is a schematic view showing a vehicle air conditioning system according to a thirteenth preferred embodiment of the present invention.

In the thirteenth embodiment, in view of what was described above, as illustrated in FIG. 20, as a cold accumulator, a plurality of cold accumulators 40a and 40b sealed with at least two kinds or more of the cold accumulating material 44 which have different melting points are used. In the thirteenth embodiment, as the cold accumulators 40a and 40b, various constitutions explained in the above-described embodiments can be used.

When the thirteenth embodiment is more specifically explained, both the cold accumulator 40a and 40b are arranged in a series downstream of the evaporator 9 in the air flow direction A. Further, the cold accumulating material 44 having a high melting point (for example, 15° C.) is sealed in the upstream cold accumulator 40a, and the cold accumulating material 44 having a low melting point (for example, 8° C.) is sealed in the downstream cold accumulator 40b.

When the air conditioning heat load is large such as in a summer condition, the target air temperature of the evaporator 9 is set to a lower temperature (for example, 3° C.) than a melting point of both of the cold accumulating materials 44, so that the cold accumulating materials 44 are solidified and the cold accumulation is conducted in both the cold accumulators 41a and 41b during vehicular running. In this way, a cooling effect can be maintained by the cold discharging operation of both the cold accumulators 40a and 40b during a vehicle stoppage.

On the contrary, when the air conditioning heat load is small such as in a condition of intermediate period of the spring and the autumn, since the target air temperature of the evaporator 9 required from the air-conditioning heat load becomes sufficiently higher as compared with that in the summer condition, the target air temperature of the evaporator 9 can be switched to a higher temperature (for example, 10° C.) than the melting point of the cold accumulating material 44 with the low melting point (for example, 8° C.).

In this way, during running of a vehicle, the cold accumulating material 44 of the high melting point (for example, 15° C.) in the upstream cold accumulator 40a is solidified and the cold accumulation due to solidification latent heat is performed. On the other hand, the cold accumulating material 44 having the low melting point (for example, 8° C.) in the downstream cold accumulator 40b is not solidified, accordingly, the cold accumulation due to the solidification latent heat is not conducted. Thus, during the stoppage of a vehicle, the cooling effect is maintained by a cold discharging operation of only the upstream cold accumulator 40a with the cold accumulating material 44 having the high melting point. In an intermediate period, since the air conditioning heat load is small, only the cold discharging operation of the upstream cold accumulator 40a can continue the required cooling effect.

Further, because the target air temperature of the evaporator 9 is switched to the temperature higher than the melting point of the cold accumulating material 44 having the low melting point (for example, 8° C.), the cooling capability of the evaporator 9 can be reduced in an intermediate period, and a decrease in the drive power of the compressor can be realized.

In particular, because the evaporator 9, the cold accumulator 40a with the cold accumulating material 44 having the high melting point (for example, 15° C.) and the cold accumulator 40b with the cold accumulating material 44 having the low melting point (for example, 8° C.) are arranged in this order, in an air flow direction A, a cold accumulation operation of the cold accumulating material 44 having the high melting point in the upstream cold accumulator 40a can be excellently conducted.

Conversely, when the evaporator 9, the cold accumulator 40b with the cold accumulating material 44 having the low melting point and the cold accumulator 40a with the cold accumulating material 44 having the high melting point are arranged in this order, cold air having a temperature of 10° C. after passing through the evaporator 9, firstly flows into the cold accumulator 40b to absorb heat in the cold accumulator 40b so that the temperature of air is increased. As a result, a temperature difference between cold air after passing through the cold accumulator 40b and the cold accumulating material 44 having the high melting point of the downstream cold accumulator 40a is decreased, and the cold accumulating performance relative to the cold accumulating material 44 having the high melting point is worsened.

Contrary to that, in the thirteenth embodiment, cold air at the temperature of 10° C. after passing through the evaporator 9, firstly flows through the cold accumulator 40a, and cools the cold accumulating material 44 inside the cold accumulator 40a by cold air immediately after passing through the evaporator 9. Accordingly, a temperature difference between cold air and the cold accumulating material 44 inside the cold accumulator 40a can be increased, the cold accumulating material 44 having the high melting point can be effectively cooled, and the cold accumulating performance of the cold accumulating material 44 having the high melting point can be improved.

(Fourteenth Embodiment)

Figure 21:
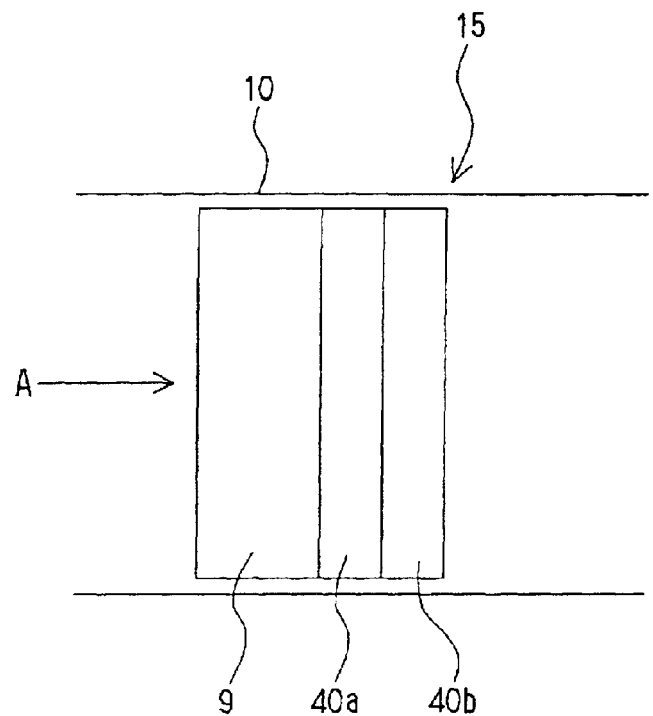
FIG. 21 is a schematic sectional view showing an arrangement relationship between an evaporator and a cold accumulator according to a fourteenth preferred embodiment of the present invention.

In the above-described thirteenth embodiment, these three heat exchangers of the evaporator 9, the upstream cold accumulator 40a and the downstream cold accumulator 40b are arranged in order inside the case 10 to be provided with the predetermined intervals between respective heat exchangers. However, in the fourteenth embodiment illustrated in FIG. 21, these three heat exchangers 9, 40a, and 40b may be arranged inside the case 10 to contact each other.

(Fifteenth Embodiment)

Figure 22:
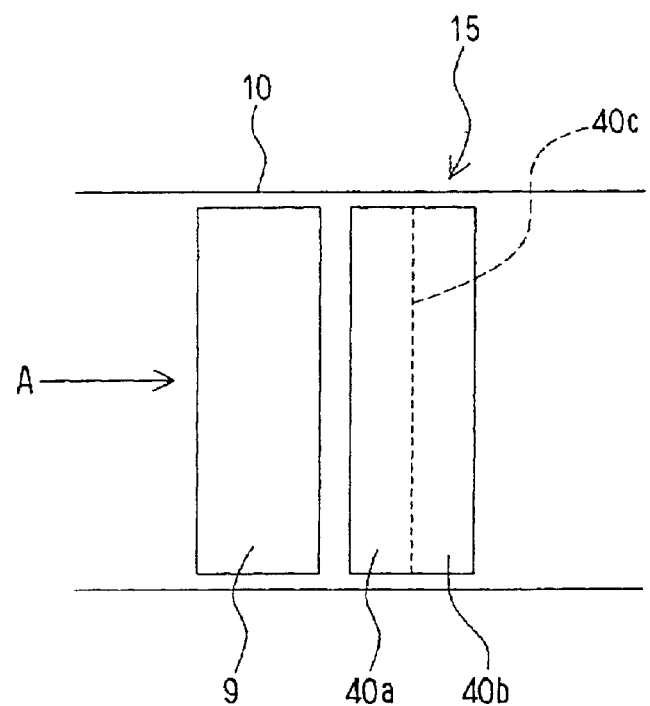
FIG. 22 is a schematic sectional view showing an arrangement relationship between an evaporator and a cold accumulator according to a fifteenth preferred embodiment of the present invention.

In the above-described thirteenth and fourteenth embodiments, both the cold accumulators 40a and 40b are constructed as physically independent heat exchangers. However, in the fifteenth embodiment illustrated in FIG. 22, the plural cold accumulators 40a and 40b are constructed as a an integral-structure heat exchanger, an inner section of the integral-structure heat exchanger is partitioned by an appropriate partitioning member 40c, and the cold accumulating materials 44 different from one another in the melting points thereof can be sealed in plural spaces partitioned by the partitioning member 40c.

(Sixteenth Embodiment)

Figure 23:
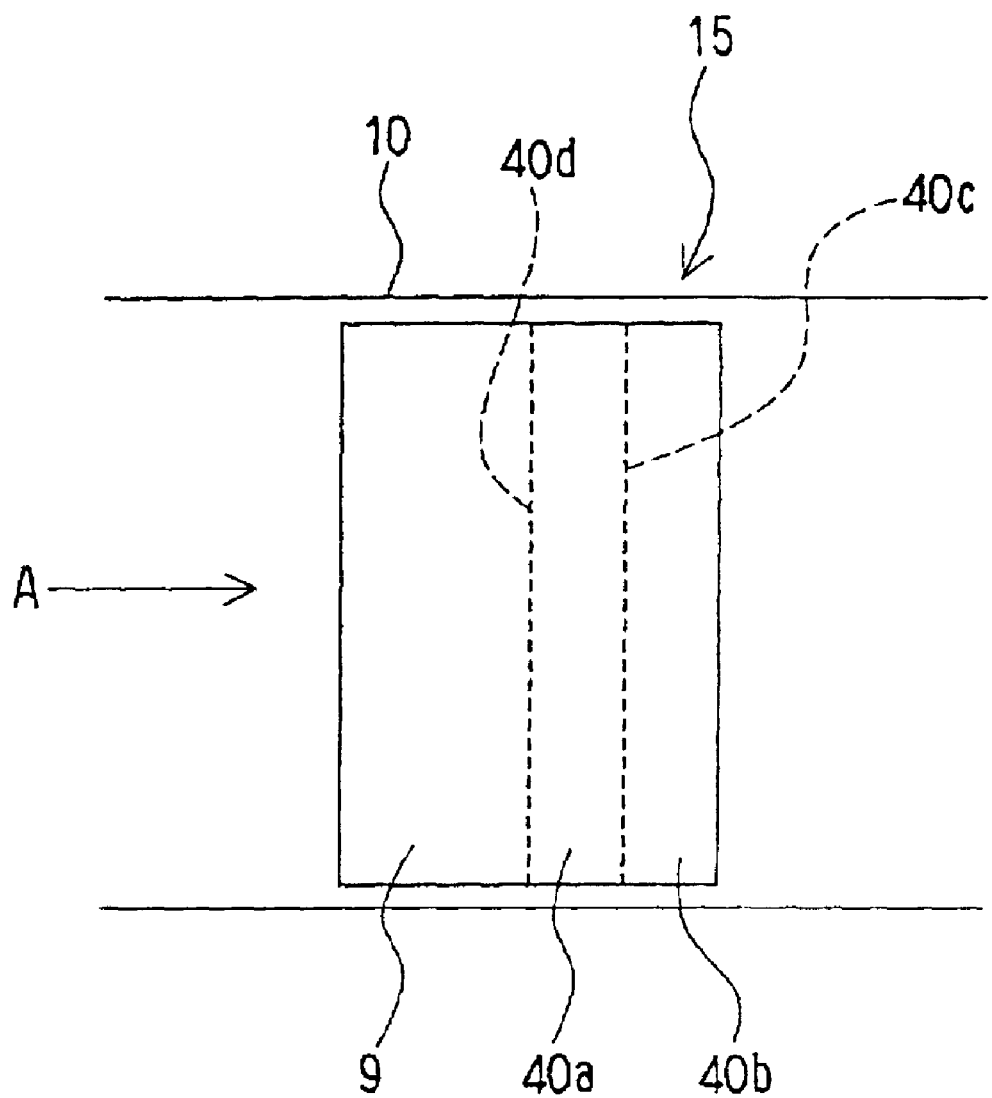
FIG. 23 is a schematic sectional view showing an arrangement relationship between an evaporator and a cold accumulator according to a sixteenth preferred embodiment of the present invention.

In the above-described fifteenth embodiment, plural cold accumulators 40a and 40b are constructed as an integral structure, and the evaporator 9 is formed as a separate body separated from the plural cold accumulators 40a and 40b. However, in the sixteenth embodiment illustrated in FIG. 23, the evaporator 9 and the cold accumulators 40a and 40b may be entirely constructed as an integral structure. In FIG. 23, a partitioning member 40d is provided to partition a refrigerant passage of the evaporator 9 and a sealing space of the cold accumulating material of the upstream cold accumulator 40a.

(Seventeenth Embodiment)

In the seventeenth embodiment, a basic structure of the air conditioning system is the same as the structure described in the first embodiment (FIG. 1). Further, the structure of the cold accumulator 40 is the same as the structure described in the first embodiment (FIG. 2).

In the seventeenth embodiment, in addition to the temperature setting switch 37a, the air volume switch 37b, the air outlet mode switch 37c, the inside/outside air changeover switch 37d and the air conditioning switch 37e described in the first embodiment, a full air conditioning switch 37f is added in the operation switch group 37.

In the seventeenth embodiment, when the full air conditioning switch 37f is turned on, a turning-on signal of the compressor 1 is outputted, and at the same time, an operation demand signal of the vehicular engine 4 is output, so that an operation state of the vehicular engine 4 is continued even during a vehicular stoppage. Contrary to that, when the air conditioning switch 37e is inputted, a turning-on signal of the compressor 1 is outputted, but the operation demand signal of the vehicular engine 4 is not outputted.

In an economically running vehicle or a hybrid vehicle of the present invention, when the full air conditioning switch 37f is not inputted, a vehicular stoppage state is determined on the basis of the revolutionary speed signal of the vehicular engine 4, the vehicular speed signal, the brake signal, and the like. In this case, the engine electronic control unit 38 automatically stops the vehicular engine 4 by a shut off of an electronic source of an ignition device, a stoppage of a fuel injection, and the like.

As described in the first embodiment, as a cold accumulating material 44, a material in which latent heat can be accumulated according to a phase change is selected. At that time, a material with the larger solidification latent heat per unit volume is preferred, the larger solidification heat per unit volume becomes a cold accumulation density. Accordingly, a specific quality of the cold accumulating material 44 is selected by systematically considering a temperature to be cold accumulated, a heat amount to be cold accumulated, a quality of material of the cold accumulator 40, and cost of the cold accumulating material, and the like.

In the seventh embodiment, a main object of the cold accumulator 40 is for cooling in a summer period in the vehicle air conditioning system. Accordingly, as a specific quality of the cold accumulating material 44, the paraffin having a solidifying point T0 of about 8° C., is selected for the reasons that the temperature Tc of the cold accumulator 40 is desirably kept at a temperature below 15° C., that a cold accumulating material is preferably solidified at a temperature equal to or higher than 0° C. in order to prevent the evaporator 9 from being frosted over, and that a corrosion preventive operation relative to a constituting quality of material (aluminum) for the cold accumulator can be obtained, and the like.

When the cold accumulation density of water is set as 1.0, the cold accumulation density of the paraffin becomes a degree of 0.5. In addition, paraffin is superior to molten salt or the other inorganics on aspects such as the chemical stability, the toxicity, and the material cost and the like.

Next, the characteristics of cold accumulating behavior according to the seventeenth embodiment will be specifically explained. In the air conditioning system, air blown from the blower 11 is firstly cooled and dehumidified by the evaporator 9, and thereafter, the air temperature blown into the passenger compartment is controlled to a target air temperature TAO by adjusting an opening degree of the air mixing door 9 and by mixing cold air with hot air. For example, even if the target air temperature TAO is relatively high temperature such as TAO=12° C., in order to complete the cold accumulation of the cold accumulating material 44 in time as short as possible, the target evaporator temperature TEO is required to be set to a temperature as low as possible.

Figure 24:
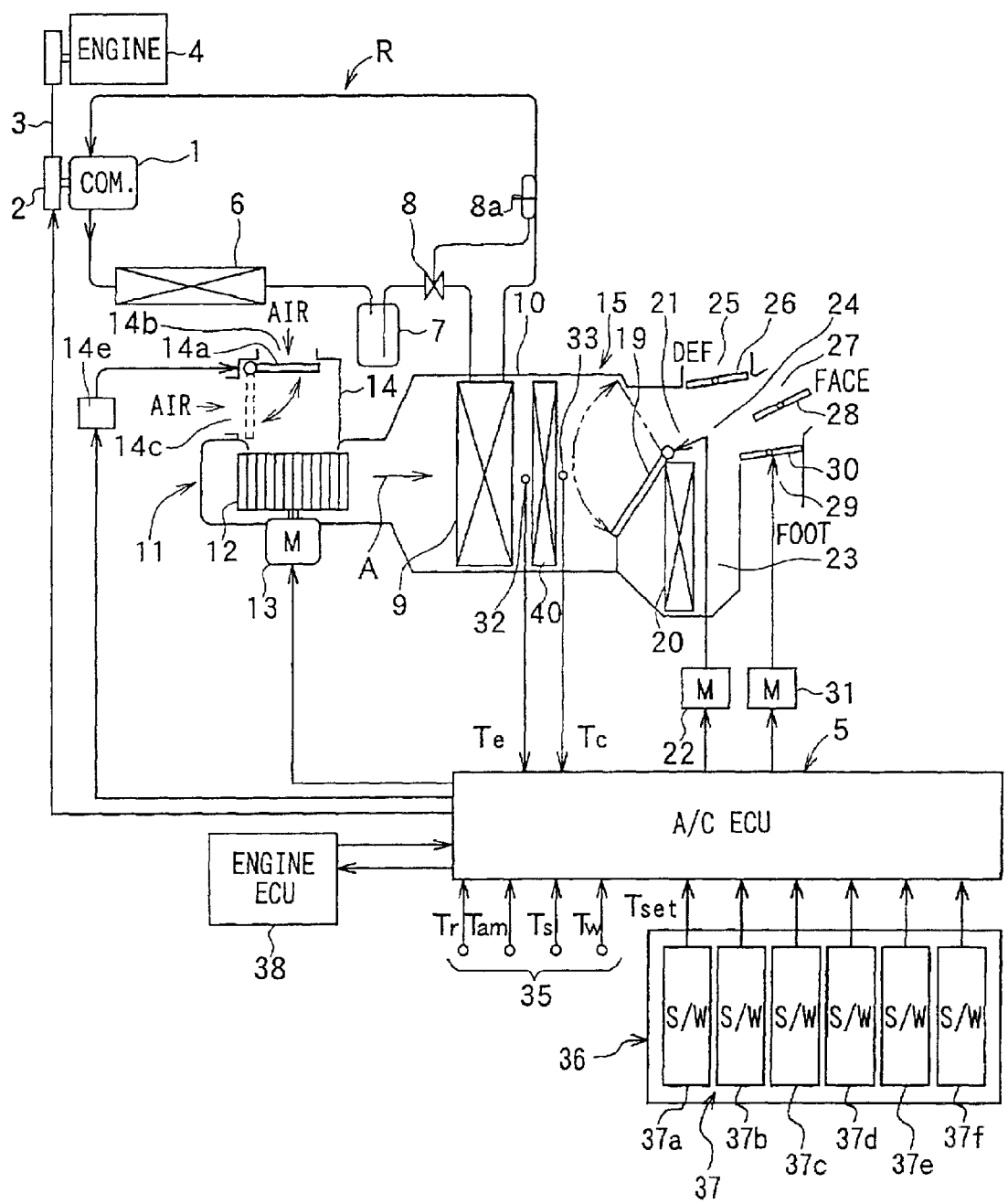
FIG. 24 is a schematic view showing an entire structure of a vehicle air conditioning system according to a seventeenth preferred embodiment of the present invention.

Because the cold accumulation of the cold accumulating material 44 is performed by cold air after passing through the evaporator 9 as illustrated FIG. 24, cooling capability Q of the cold accumulating material 44 can be calculated by the following equation 1.

$$Q=\alpha \cdot F \cdot (Tc'-Te)$$ [Equation 1]

where, α: coefficient of heat transfer, F: surface area of the cold accumulator 40, Tc': surface temperature of the cold accumulator 40, Te: air temperature of the evaporator 9.

In the equation 1, the and F are constant values decided by the specification of the cold accumulator 40, and the Tc' is a constant temperature (solidifying temperature T0) decided by a quality of the cold accumulating material 44 after starting solidification of the cold accumulating material 44. In order to complete the cold accumulation in a short time, the air temperature Te of the evaporator 9 should be set to the temperature as low as possible. However, when Te<0° C., the evaporator 9 is frosted (freezing of condensed water), thus there causes a problem that cooling capability of the evaporator 9 is lowered.

Figure 25:
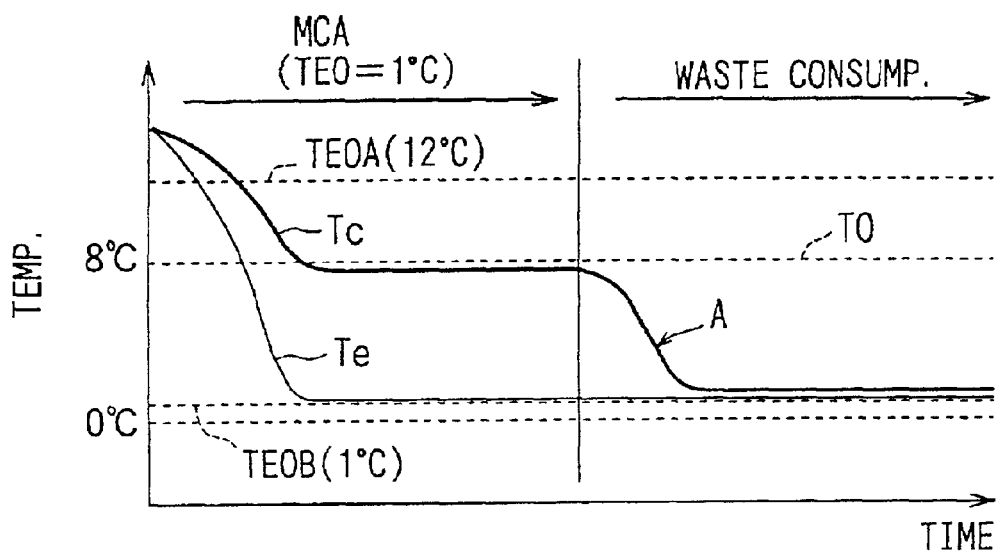
FIG. 25 is view for explaining a cold accumulating control according to a comparison example of the seventeenth embodiment.

Thus, the present inventors firstly set a target evaporator temperature TEOB (that is, evaporator air temperature Te) during the cold accumulation to 1° C., and studied the cold accumulating behavior in a comparison example. In the comparison example shown in FIG. 25, the maximum cooling accumulation state (the maximum cooling capability Q) is set in a range in which the evaporator 9 can be prevented from being frosted. FIG. 25 shows a result showing the cold accumulating behavior of the comparison example.

When the maximum cold accumulation (MCA) state described above is set when TEO=1° C., since the cold accumulating material 44 can be rapidly cooled by a low-temperature cold air of 1° C., as illustrated in the solid line A in FIG. 25, a temperature (cold accumulator air temperature Tc) of the cold accumulating material 44 can be lowered abruptly. In the seventeenth embodiment, paraffin having the solidifying point T0=8° C. is utilized as the cold accumulating material 44. Accordingly, when the temperature of the cold accumulating material 44 is lowered to the temperature of 8° C., the solidification of the cold accumulating material 44 is started, and the solidifying latent heat of the cold accumulating material 44 is absorbed from low-temperature cold air of 1° C. Further, during this solidification of the cold accumulating material 44, since the temperature of the cold accumulating material 44 is maintained at 8° C. of the solidifying point T0, the air temperature Tc blown from the cold accumulator 40 is substantially maintained at a constant value of 8° C.

Further, after solidification of the cold accumulating material 44, that is, after the cold accumulation is completed in the cold accumulator 40, when the target evaporator temperature TEOB=1° C. in the cold accumulation is continued, the cold accumulating material 44 is continuously cooled by low-temperature cold air of 1° C., and the cold accumulating material 44 is also cooled to a temperature of 1° C., as shown in FIG. 25. In the comparison example illustrated in FIG. 25, in a case where the target evaporator temperature TEOA required for the air conditioning is 12° C., for the purpose of the rapid cold accumulation, the maximum cold accumulation state is set such as the target evaporator temperature TEOB=1° C. of the cold accumulation, and this state is continued after the completion of the cold accumulation. However, this state leads to waste consumption of power of the compressor 1 of the refrigerant cycle.

Figure 26:
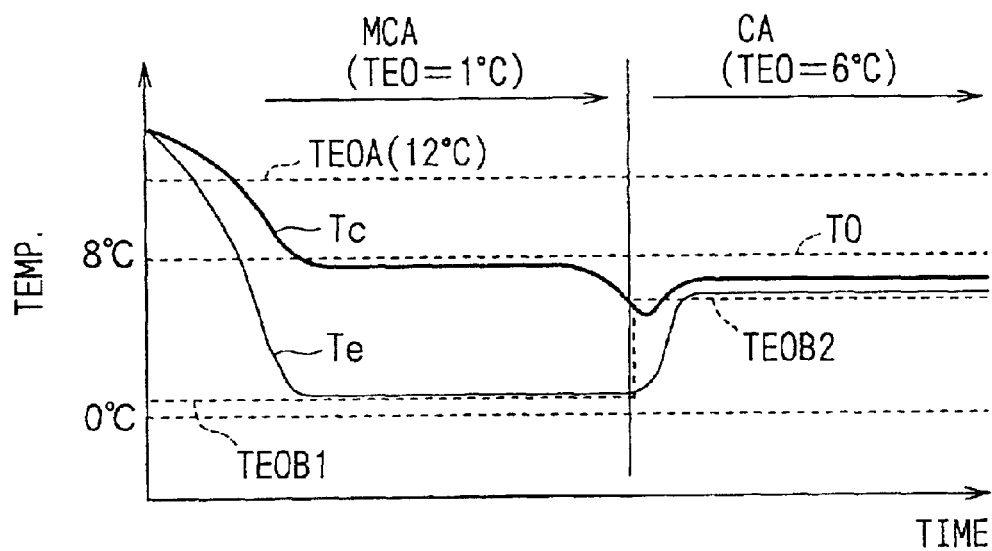
FIG. 26 is a view for explaining a cold accumulating control according to the seventeenth embodiment.

Thus, in the seventeenth embodiment, the completion of the cold accumulation of the cold accumulating material 44 is determined, the target evaporator temperature after the completion of the cold accumulation is switched from a first target evaporator temperature TEOB1 to a second target evaporator temperature TEOB2 for maintaining the cold accumulation, higher than the first target evaporator temperature TEOB1 of the initial cold accumulation, as illustrated in FIG. 26. Here, TEOB2 is set to a temperature (for example, 6° C.) slightly lower than the solidifying point T0 (8° C.) of the cold accumulating material 44 for the purpose of maintaining a cold accumulation (solidification) state of the cold accumulating material 44.

Figure 27:
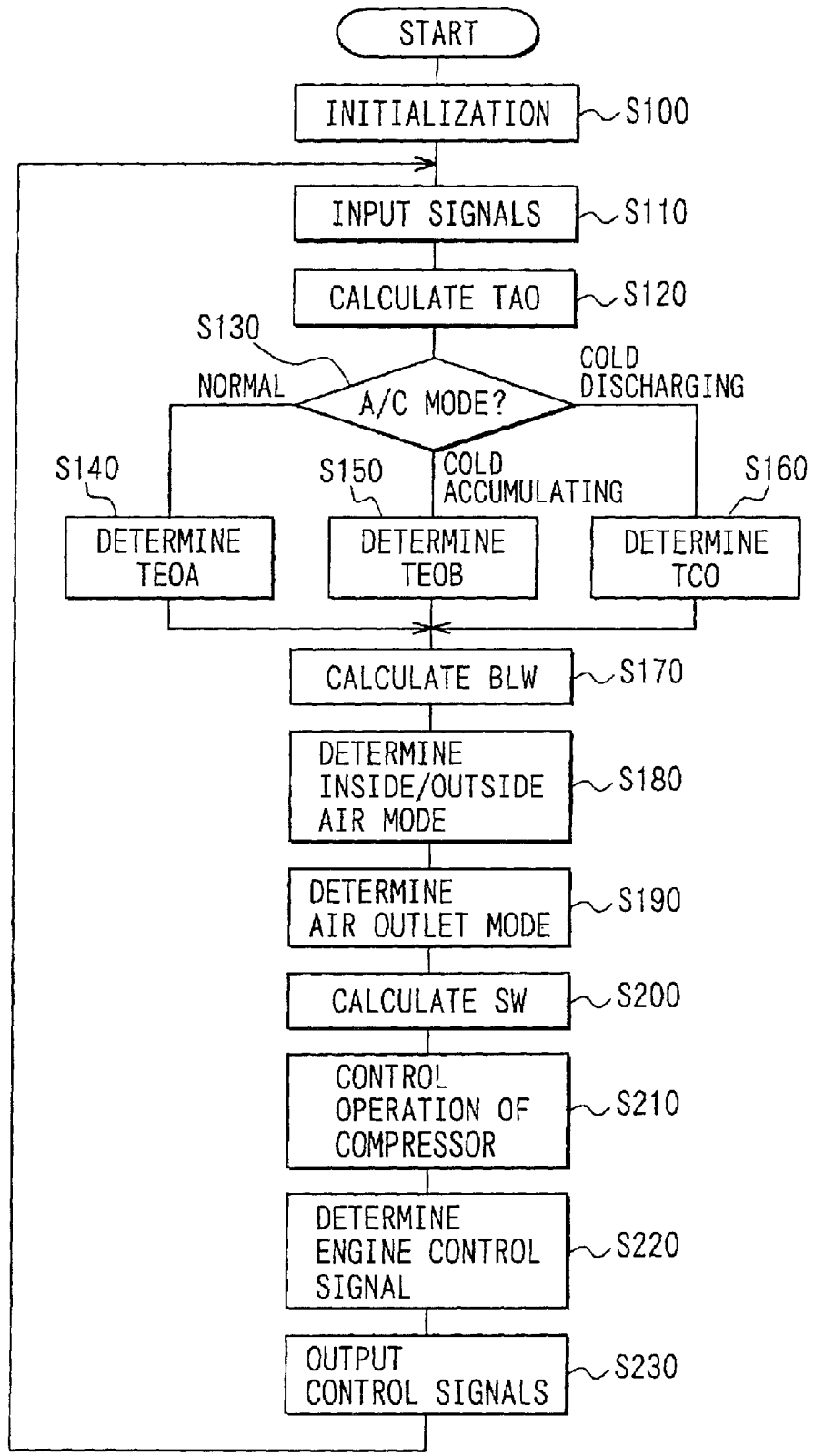
FIG. 27 is a flow diagram showing an air-conditioning control according to the seventeenth embodiment.

Next, a specific cold accumulation control according to the seventeenth embodiment will be explained. FIG. 27 shows a flow diagram illustrating an air-conditioning control carried out by a microcomputer of the air-conditioning electronic control unit 5. The control routine illustrated in FIG. 27 is started, when the ignition switch of the vehicular engine 4 is turned on and an electric power is supplied to the electronic control unit 5, and when the air volume switch 37b (or automaticswitch) of the operation switch group 37 of the air-conditioning control panel 36 is turned on.

Firstly, at step S100, a flag, a timer, and the like are initialized. At next step S110, detection signals from the sensors 32 and 33 and the sensor group 35, operational signals from the operation switch group 37, a vehicular operation signal from the engine electronic control unit 38 or the like are read in. At step S120, the target air temperature TAO of conditioned air blown into the passenger compartment is calculated.

This target air temperature TAO is the temperature required for maintaining a set temperature Tset set by the temperature setting switch 37a inside the passenger compartment, and is calculated on the basis of the equation 2 described below.

$$TAO = Kset \times Tset - Kr \times Tr - Kam \times Tam - Ks \times Ts + C \quad \text{[Equation 2]}$$

Where, Tr is an inside air temperature detected by the inside air temperature sensor of the sensor group 35, Tam is an outside air temperature detected by the outside air temperature sensor of the sensor group 35, Ts is a solar radiation amount detected by the solar radiation sensor of the sensor group 35, Kset, Kr, Kam and Ks are control gains, and C is a constant for correction.

Next, at step S130, it is determined whether or not an air conditioning mode is a normal mode, a cold accumulating mode, or a cold discharging mode. Here, the normal mode and the cold accumulating mode can be set during an operation (during running of vehicle) of the engine 4, and a selection of the normal mode and the cold accumulating mode can be performed on the basis of the target air temperature TAO described above and the operation states of the air conditioning switch 37e and the full air conditioning switch 37f of an air conditioning control panel 36.

That is, when the full air conditioning switch 37f is turned on, the operation demand signal of the vehicular engine 4 is outputted as described above, and the operation state of the vehicular engine 4 is continued during the stoppage of the vehicle. In this case, the cold accumulating mode is unnecessary, and the normal mode is selected when the full air conditioning switch 37f is turned on.

Further, when the air conditioning switch 37e is turned on, and when TAO is equal to or more than a predetermined temperature (for example, 35° C.) in a heating area, because the cold accumulating mode is unnecessary, also the normal mode is selected.

Contrary to that, when the air conditioning switch 37e is turned on, and when the TAO is lower than the predetermined temperature (for example, 35° C.) of the heating area, the area is a cooling necessary area. In this case, because the cold accumulating mode becomes necessary, the cold accumulating mode can be selected.

In the seventeenth embodiment, in the operation switch group 37 of the air-conditioning control panel 36, a cold accumulation switch can be added. In this case, only when the cold accumulation switch is turned on, the cold accumulating mode is selected. On the other hand, when the cold accumulation switch is turned off, the normal mode can be selected.

On the other hand, in a case where the air conditioning switch 37e is turned on, when the vehicle engine 4 (compressor 1) is stopped, the cold discharging mode is selected.

Figure 28:
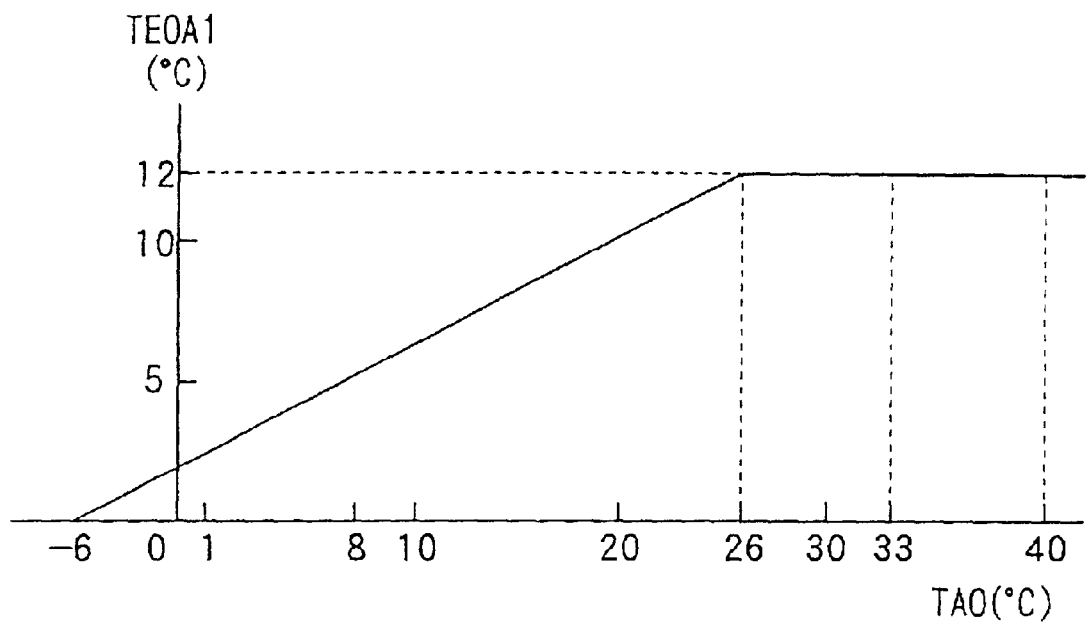
FIG. 28 is a characteristic view of a first target evaporator temperature according to the seventeenth embodiment.
Figure 29:
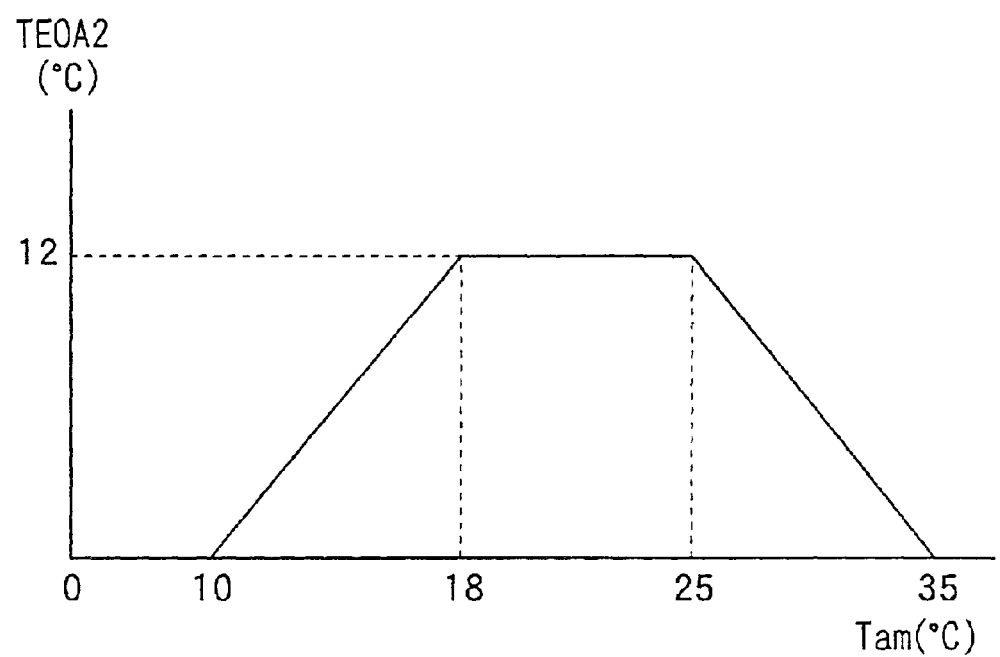
FIG. 29 is a characteristic view showing a second target evaporator temperature according to the seventeenth embodiment.

When the normal mode is selected, at step S140, the target evaporator temperature TEOA during the normal mode is decided. The target evaporator temperature TEOA during the normal mode, is a target temperature required for air conditioning decided by an air-conditioning environment condition. In this seventeenth embodiment, the TEOA is determined on the basis of a first target evaporator temperature TEOA1 illustrated in FIG. 28 and a second target evaporator temperature TEOA2 illustrated in FIG. 29. The first target evaporator temperature TEOA1 is set to be increased according to an increase of the TAO. Accordingly, TEOA1 is expressed as TEOA1=f (TAO). In the seventeenth embodiment, an upper limit of the first target evaporator temperature TEOA1 is set at 12° C.

Further, the second target evaporator temperature TEOA2 is determined based on the outside air temperature Tam, and can be represented as f (Tam). In the TEOA2, because a necessity for cooling and dehumidification is lowered at an intermediate temperature area (for example, 18° C. to 25° C.) of the outside air temperature Tam, by increasing the second target evaporator temperature TEOA2 (for example, 12° C.), operation of the compressor 1 can be reduced, and power saving of the vehicular engine 4 can be realized.

On the other hand, at time of high temperature in a summer period in which the outside air temperature Tam exceeds 25° C., the TEOA2 is lowered inversely proportional to an increase of the outside air temperature Tam in order to secure cooling capability. Further, in a low temperature area where the outside air temperature Tam becomes lower than the temperature of 10° C., in order to secure dehumidifying capability for the purpose of preventing a cloud of the window glass, the TEOA2 is lowered along with a reduction in the outside air temperature Tam.

Further, in the normal mode (when not the cold accumulating mode) during an operation of the engine 4, among the first and second target evaporator temperature TEOA1 and TEOA2 described above, the one having a low temperature is determined finally as the target evaporator temperature TEOA.

Next, at step S170, a target quantity BLW of air blown by the blower 11 is calculated on the basis of the TAO described above. A calculating method of the target quantity BLW is well known. That is, the target quantity is increased on a high temperature side (maximum heating side) and on a low temperature side (maximum cooling side) of the TAO described above, and the target quantity BLW is reduced in an intermediate temperature area of the TAO described above.

Next, at step S180, the inside/outside air mode is determined. The inside/outside air mode is set to be switched to an entire inside air mode an→inside/outside air mixing mode→an entire outside air mode, for example, according to an increase in the TAO described above from a low temperature side to a high temperature side. However, in the cold accumulating mode, until the cold accumulation is completed, irrespective of a condition described above, the inside air mode is forcibly set. Therefore, an effect of the rapid cold accumulation due to a reduction in a cooling load can be improved.

Next, at step S190, an air outlet mode according to the TAO described above is determined. The air outlet mode is set, along with an increase of the TAO from a low temperature side to a high temperature side, to be switched to a face mode→a bi-level mode→a foot mode.

Next, at step S200, a target opening degree SW of the air mixing door 19 is calculated on the basis of the TAO described above, the cold accumulator air temperature Tc, and the hot water temperature Tw. Here, the target opening degree SW of the air mixing door 19 is represented by a percentage when a maximum cooling position (solid line position in FIG. 24) of the air mixing door 19 is 0% and a maximum heating position (chain line position in FIG. 24) of the air mixing door 19 is 100%.

Next, the program is advanced to step S210, an applied voltage Vc to the electromagnetic clutch 2 is determined by comparing the target evaporator temperature TEOA with the evaporator air temperature Te detected by the temperature sensor 32, and an intermittent operation (ON-OFF) of the compressor 1 is determined. That is, when the evaporator air temperature Te is lowered below the target evaporator temperature TEOA, engagement of the clutch becomes OFF (interlocking of compressor becomes OFF) by setting the applied voltage Vc to 0V. Further, when the evaporator air temperature Te is increased to higher than TEOA+a, engagement of the clutch becomes ON (interlocking of compressor becomes ON) by setting the applied voltage Vc to 12V. In (TEOA+a), a denotes a hysteresis width of an intermission control of the compressor, and normally is 1° C. Accordingly, at step S210, the operation of the compressor 1 can be controlled.

Next, the program is advanced to step S220, and an engine control signal is determined on the basis of the air conditioning condition. That is, an engine control signal (permission/prohibition of the stoppage of the vehicular engine 4 described above and re-operation demand signal after the stoppage of the vehicular engine 4) is determined.

Next, the program is advanced to step S230, respective control signals determined by respective steps described above are outputted to respective control object members. That is, a rotation speed of the blower 11, operation positions of the inside/outside air door 14a, air outlet mode doors 26, 28, and 30, and the air mixing door 19 are controlled, such that the target quantity BLW at step S170, the inside/outside air mode of step S180, the air outlet mode of step S190, and the target opening degree SW of step S200 can be obtained.

Further, the operation of the compressor 1 is intermittently controlled on the basis of the applied voltage Vc to the clutch determined at step S210. Accordingly, the evaporator air temperature is controlled to the target evaporator temperature TEOA in the normal air-conditioning. Further, the engine control signal determined at step S220 is outputted to the engine electronic control unit 38.

Figure 30:
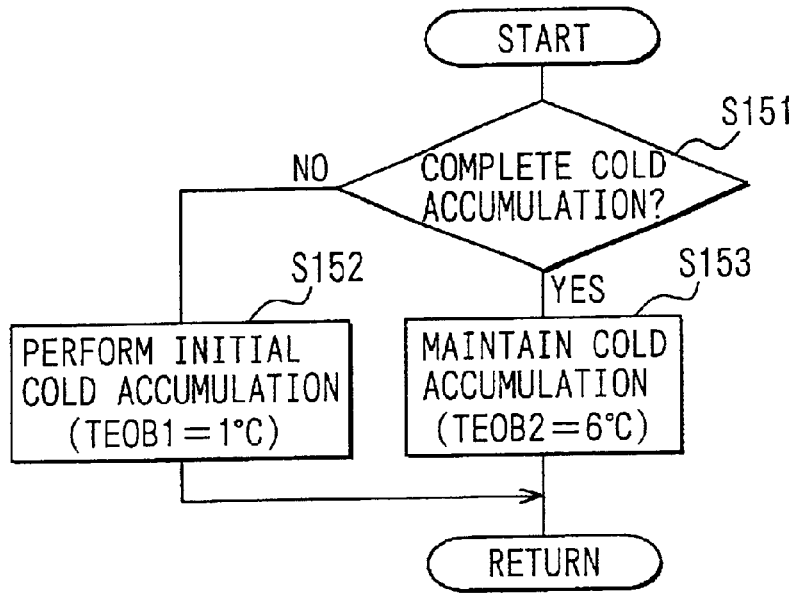
FIG. 30 is a flow diagram showing a control in a cold accumulation mode according to the seventeenth embodiment.

On the other hand, when the cold accumulating mode is selected at step S130, a target evaporator temperature TEOB for the cold accumulation is determined based on a flow diagram illustrated in FIG. 30. At step S151, firstly, it is determined whether or not the cold accumulation of the cold accumulating material 44 is completed. Specifically, it is determined whether or not the cold accumulator air temperature Tc is reduced to lower than the solidifying temperature T0 (8° C.) of the cold accumulating material. In the seventeenth embodiment, the completion of the cold accumulation is determined when Tc<6° C. is satisfied.

When Tc is higher than 6° C., it is determined that the cold accumulation is not completed, the program is advanced to step S152, and the initial cold accumulation with TEOB1=1° C. is set. On the other hand, when the temperature of Tc<6° C. is determined, it is determined that the cold accumulation is completed, and the program is advanced to step S153. In this case, the cold accumulation with TEOB2=6° C. is set, and is maintained.

As described above, at the beginning of the cold accumulation, the initial cold accumulation with TEOB1=1° C. is performed, and the compressor 1 is intermittently controlled such that the operation of the compressor 1 becomes OFF at the evaporator air temperature of Te=1° C., and the operation of the compressor 1 becomes ON at the evaporator air temperature of Te=2° C. In this way, the evaporator air temperature Te is controlled at the low temperature such as substantially 1° C. Accordingly, using cold air with the low temperature substantially at 1° C., the rapid cooling accumulation of the cooling accumulating material 44 can be realized. Specifically, as the cold accumulating material 44, 300 cc of paraffin having the solidifying point T0 of 8° C. is utilized, in the case where the cold accumulating material 44 is cooled by cold air having the low temperature of substantially 1° C. In this case, the cold accumulation (solidification) of the cold accumulating material 44 can be completed in about one minute.

On the other hand, after the completion of the cold accumulation, because the target evaporator temperature TEO is increased from the TEOB1 (1° C.) in the initial cold accumulation to the TEOB2 (6° C.) in the cold accumulation maintenance. Accordingly, while the cold accumulation state of the cold accumulating material 44 is maintained, the rate of operation (ratio of ON time relative to ON-OFF total time) of the compressor 1 is remarkably reduced as compared with that of initial cold accumulation with TEOB1=1° C. As a result, drive power of the compressor 1 can be reduced. Specifically, under a condition that the outside air temperature Tam is 30° C. and a vehicle speed is 40 km/h, a ratio of power consumed in the compressor 1 in the initial cold accumulation of TEOB1=1° C. and that in the maintenance of the cold accumulation of TEOB2=6° C. is 1.2:1. Therefore, the power consumed in the compressor 1 can be drastically reduced after completion of the cold accumulation.

In this way, according to the seventeenth embodiment, antinomic issues such as the rapid cold accumulation of the cold accumulating material 44 and a reduction in the drive power of the compressor 1 can be compatible using both cold accumulating temperatures TEOB1 and TEOB2.

Next, when the cold discharging mode is selected at step S130 illustrated in FIG. 27, the program is advanced to step S160, and a critical cold accumulator temperature (Critical TCO) in the cold discharging mode is determined. The critical TCO is the cold accumulator temperature in the cold discharging mode. Specifically, the critical TCO is a temperature (upper limit value) of a perceptible limit point where a passenger does not feel a change of humidity, a change of temperature, a generation of a smell and generation of cloud of the window glass, due to an increase in the cold accumulator air temperature Tc. Accordingly, the critical TCO can fixed to a predetermined temperature, for example, at 12° C., or, the critical TCO can be corrected according to a change in environment in the cold discharging mode.

Further, in the cold discharging mode, at step S220, the cold accumulator air temperature Tc detected by the temperature sensor 33 is compared with the critical TCO described above. In this case, when the temperature Tc is lower than the critical TCO, a signal of permission of the stoppage of the vehicular engine 4 can be continued. In this way, the stoppage state of the engine 4, that is, the cold discharging mode is continued.

Due to a continuation of the cold discharging mode, when the temperature Tc is increased so that a relationship Tc ≧ the critical TCO is satisfied, the engine operation demand signal is outputted, the vehicular engine 4 is restarted, and the cooling operation of the evaporator 9 according to an operation of the compressor 1 is restarted. Accordingly, in this case, the cold discharging mode is finished.

According to the seventeenth embodiment, the cold accumulator 40 is disposed downstream of the evaporator 9, further, upstream of the air mixing door 19, without being dependent on the rotational position of the air mixing door 19. Therefore, the cold accumulator 40 can be excellently cooled by cold air after passing through the evaporator 9.

In particular, because the cold accumulator 40 is structured to be cooled by cold air and the cold accumulator 40 is formed of a finless structure, the cold accumulator 40 has a simple structure. Further, because the cold accumulator 40 is the finless structure, an accommodation space of the cold accumulating material can be enlarged inside the cold accumulator 40, and the cold accumulation capability can be increased in the cold accumulator 40.

(Eighteenth Embodiment)

The eighteenth embodiment is for improving a reduction effect of drive power of the compressor 1 more than the seventeenth embodiment. When an actual traveling pattern of a vehicle is considered, in traveling in an urban area in a city section, there are many cases having a traveling pattern that repeats frequently from waiting for a traffic signal or the like, and after a short time traveling a degree of one minute, after which the vehicle is stopped, and after thirty seconds, the vehicle restarts the traveling. On the other hand, in a suburban area, the number of traffic signals are smaller than in an urban area, however, it is rare that a vehicle travels continuously for more than five minutes.

Accordingly, in either of the urban area traveling or the suburban area traveling of the vehicle, at a start time of the vehicle traveling due to a re-operation of the vehicular engine 4, by setting the maximum cold accumulation state as illustrated in the seventeenth embodiment, rapid cold accumulation is conducted by cold air at a temperature of 1° C. After the completion of the cold accumulation, the cold accumulation state is maintained by cold air at a temperature slightly lower than the solidifying point T0 of the cold accumulating material 44.

However, in an express-highway, it sometimes happens that once the traveling starts, the vehicle continuously travels for 1–2 hours. In this case, when the cold accumulation state (TEOB2=6° C.) is continuously performed for a long time similar to the seventeenth embodiment, the drive power of the compressor 1 is wasted.

That is, when an ON-OFF control of the compressor 1 is performed at a low target temperature such as TEOB2=6° C. during a long time, the consumed power of the compressor 1 is increased as compared with the normal mode where the ON-OFF control of the compressor 1 is performed under the temperature TEOA of 12° C.

Figure 31:
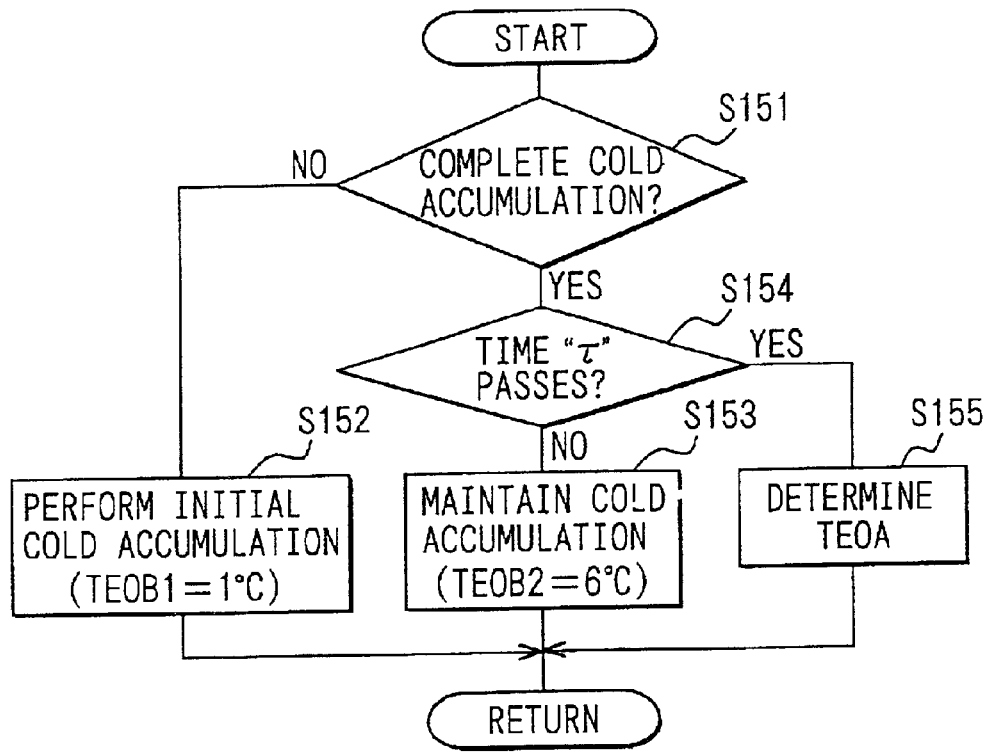
FIG. 31 is a flow diagram showing a control in a cold accumulation mode according to an eighteenth preferred embodiment of the present invention.

By paying attention to the what is described above, in the eighteenth embodiment, as illustrated in FIG. 31, when a completion of the cold accumulation is determined at step S151, it is determined whether or not an elapsed time after the completion of the cold accumulation passes a predetermined time τ at step S154. Here, the predetermined time τ is, for example, five minutes. When the elapsed time after the completion of the cold accumulation is within the predetermined time τ, the same control as the seventeenth embodiment is performed at step S153, and the control of the cold accumulation maintenance with TEOB2=6° C. is performed.

On the other hand, when the elapsed time after the completion of the cold accumulation passes the predetermined time τ, the program is advanced to step S155 from step S154, and the target evaporator temperature TEOA during the normal mode is determined. The TEOA is the same as a value calculated at step S140 in FIG. 27 and is the value essentially required for the air conditioning control.

Figure 32:
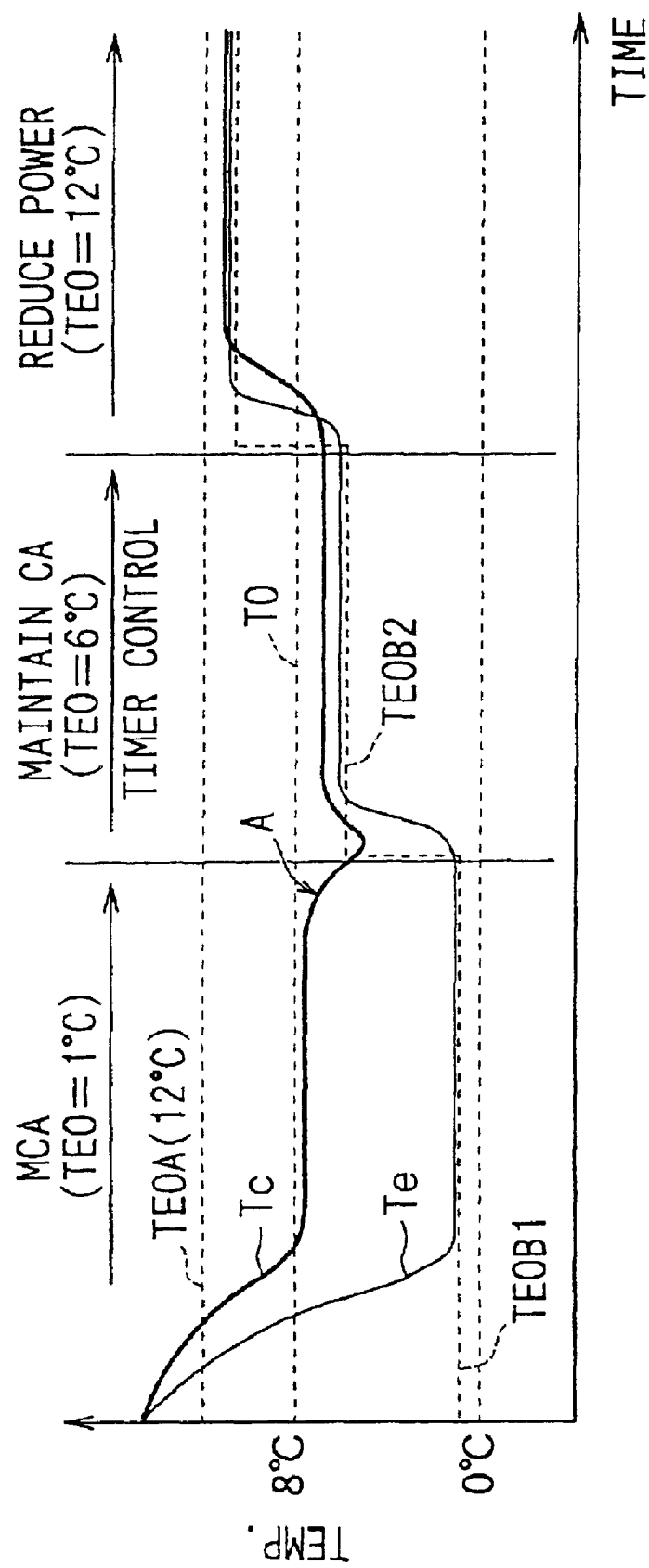
FIG. 32 is a view for explaining a cold accumulating control according to the eighteenth embodiment.

According to the eighteenth embodiment, under a condition that the target evaporator temperature TEOA for the air conditioning control is, for example, 12° C., after the predetermined time τ is elapsed after the completion of the cold accumulation, as illustrated in FIG. 32 the evaporator air temperature TEO can be increased to the temperature TEOA of 12° C. which is a higher temperature than the solidifying point T0 of the cold accumulating material 44. With this contrivance, the power of the compressor 1 can be reduced to a level of the minimum necessity.

(Other Embodiment)

In the seventeenth embodiment described above, the entire volume of cold air after passing through the evaporator 9 passes through the cold accumulator 40 by setting the front surface area of the cold accumulator 40 to be equal to that of the evaporator 9. However, by decreasing the front surface area of the cold accumulator 40 less than that of the evaporator 9, a bypass passage of the cold accumulator 40 is formed, and a part of cold air after passing through the evaporator 9 may bypass the cold accumulator 40.

In the seventeenth embodiment described above, also entire volume of air blown by the blower 11 is devised to pass through the evaporator 9. However, a bypass passage through which air bypasses both of the evaporator 9 and the cold accumulator 40 may be formed inside the air conditioning case 10, and an opening degree of the bypass passage may be adjusted by a bypass door.

In the first and seventeenth embodiments described above, the temperature sensor 32 for detecting the evaporator air temperature Te is utilized as temperature detecting means for detecting an air temperature blown from the evaporator 9. However, a temperature sensor for detecting the temperature of a wall surface for a refrigerant passage of the evaporator 9 or a surface temperature of a fin may be utilized.

Further, as the temperature detecting means for detecting the temperature of the cold accumulator 40, the temperature sensor 33 for detecting the air temperature Tc of the cold accumulator 40 is used. However, a temperature sensor for detecting the temperature of the wall surface of the cold accumulator 40 or the surface temperature of the fin of the cold accumulator 40 may be utilized.

In the seventeenth embodiment described above, after the completion of cold accumulation of the cold accumulating material 44, the target evaporator temperature is switched to the target temperature TEOB2 slightly lower than the solidifying point T0 of the cold accumulating material 44 for maintaining the cold accumulation state of the cold accumulating material 44. However, when the bypass passage through which cold air bypasses the cold accumulator 40 is provided, the bypass passage is opened by a door and an air passage of the cold accumulator 40 is closed, after the completion of the cold accumulation of the cold accumulating material 44. Accordingly, in this case, air from the evaporator does not pass through the cold accumulator 40. In this way, after the completion of the cold accumulation, the target evaporator temperature can be immediately switched to the temperature TEOA (for example, 12° C.) required for air conditioning, and the cold accumulation state of the cold accumulating material 44 is allowed to be maintained. In this case, further improvement in the reduction effect of the power of the compressor 1 can be realized.

In the embodiments described above, the temperature of the evaporator 9 is controlled by intermittent operation of the compressor 1. However, when the compressor 1 is a well known variable displacement type, the temperature of the evaporator 9 can be controlled by an adjustment of a displacement of the compressor.

The cold accumulator 40 in the fifth-seventh embodiments (FIG. 7-FIG. 9) may be constructed by either of a heat-exchanging structure illustrated in FIG. 2-FIG. 6, the heat-exchanging structure illustrated in FIG. 12-FIG. 18, and the heat-exchanging structure illustrated in FIG. 19.

In the embodiments described above, as a material of the cold accumulator 40, aluminum is utilized. However, metals such as copper, iron and the like can be utilized other than aluminum. Further, the cold accumulator 40 may be made of a resin. When the cold accumulator 40 is made of resin, although heat transfer performance is lowered to some degree, manufacturing of the cold accumulator 40 becomes easy, and cost of the cold accumulator 40 can be reduced.

As the melting point of the cold accumulating material 44, the temperature range of 6° C.–8° C. is explained in the first embodiment described above. However, from a view point of preventing an evaporator from being frosted and of securing the cooling effect due to the cold discharge of the cold accumulating material 44, the melting point of the cold accumulating material 44 can be set in a range of 3° C.–18° C.

In respective embodiments described above, the evaporator 9 and the cold accumulator 40 are arranged to extend in the vertical direction. However, the evaporator 9 and the cold accumulator 40 can be disposed to be tilted relative to the vertical direction or can be disposed to extend approximately horizontally.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An air conditioning system for a vehicle having a passenger compartment, the system comprising:
    a case defining an air passage through which air flows into the passenger compartment;
    a cooling heat exchanger in which refrigerant of a refrigerant cycle flows, the cooling heat exchanger being disposed in the air passage;
    a heating heat exchanger disposed at a downstream side of the cooling heat exchanger in an air flow direction;
    an air mixing door disposed to adjust a flow amount ratio between air passing through the heating heat exchanger and air bypassing the heating heat exchanger; and
    a cold accumulator disposed in the case between the cooling heat exchanger and the air mixing door, the cold accumulator having a cold accumulating material that is sealed only within the cold accumulator.

2. The air conditioning system according to claim 1, further comprising:
    the case having a bypass passage through which air bypasses the cooling heat exchanger and the cold accumulator; and
    a bypass door disposed to adjust a flow amount of air passing through the bypass passage.

3. The air conditioning system according to claim 1, further comprising the cold accumulator and the cooling heat exchanger being integrally disposed to form an integrated structure.

4. The air conditioning system according to claim 1, further comprising:
    the cold accumulator having a plurality of tubes each of which is made of a metal; and
    the cold accumulating material being sealed in the tubes.

5. The air conditioning system according to claim 4, further comprising the tubes of the cold accumulator being stacked adjacent each other to define a wave shaped cold air passage between adjacent tubes.

6. The air conditioning system according to claim 1, further comprising:
    the cold accumulator having a tube formed in a serpentine shape to form a plurality of folded tube portions; and
    the cold accumulating material being sealed in the tube.

7. The air conditioning system according to claim 6, further comprising the cold accumulator further having a fin disposed between the folded tube portions.

8. The air conditioning system according to claim 6, further comprising a plurality of the tubes, each of which is formed in a serpentine shape, being disposed to be connected integrally.

9. The air conditioning system according to claim 1, further comprising the cold accumulator having a plurality of tubes filled with the cold accumulating material, and a fixing member disposed to fix both ends of each of the tubes.

10. The air conditioning system according to claim 9, further comprising:
    each of the tubes having a flat shape in cross-section;
    the tubes being arranged so that a major direction of the flat shape of each tube is along the air flow direction in the cold accumulator;
    the fixing member having a plurality of recesses arranged to correspond to the arrangement of the tubes; and
    at least one side end of each of the tubes being fitted into a respective recess of the fixing member.

11. The air conditioning system according to claim 1, further comprising:
    the cold accumulator having a first cold accumulating portion and a second cold accumulating portion; and
    the cold accumulating material including a first material sealed in the first cold accumulating portion and a second material sealed in the second cold accumulating portion.

12. The air conditioning system according to claim 11, further comprising:
    the cold accumulator having therein an inner partition member; and
    the first cold accumulating portion and the second cold accumulating portion being integrally disposed to be defined by the inner partition member.

13. The air conditioning system according to claim 11, further comprising:
    the first material having a melting point higher than that of the second material; and
    the first cold accumulating portion being disposed at an upstream side of the second cold accumulating portion in the air flow direction.

14. The air conditioning system according to claim 1, further comprising:
    the cooling heat exchanger being an evaporator of the refrigerant cycle.

15. The air conditioning system according to claim 1, further comprising:
    a control unit for controlling temperature of air to be blown into the passenger compartment;
    the control unit controlling temperature of the cooling heat exchanger to a target cooling temperature;
    the control unit setting the target cooling temperature at an initial target temperature in a cold accumulation mode; and
    when the control unit determines a finish of the cold accumulation mode, the control unit sets the target cooling temperature to a temperature that is higher than the initial target temperature.

16. An air conditioning system for a vehicle having a passenger compartment, the system comprising:
    a case defining an air passage through which air flows into the passenger compartment;
    a cooling heat exchanger in which refrigerant of a refrigerant cycle flows, the cooling heat exchanger being disposed in the air passage;
    a heating heat exchanger disposed at a downstream side of the cooling heat exchanger in an air flow direction;
    a heating adjustment member which is disposed to adjust a heating capacity of the heating heat exchanger; and
    a cold accumulator disposed in the case between the cooling heat exchanger and the heating heat exchanger, the cold accumulator having a cold accumulating material that is sealed only in the cold accumulator.

17. The air conditioning system according to claim 16, further comprising:
    the case having a bypass passage through which air bypasses the cooling heat exchanger and the cold accumulator; and
    a bypass door disposed to adjust a flow amount of air passing through the bypass passage.

18. The air conditioning system according to claim 16, further comprising the cold accumulator and the cooling heat exchanger being integrally disposed to form an integrated structure.

19. The air conditioning system according to claim 16, further comprising:
    the cold accumulator having a plurality of tubes each of which is made of a metal; and
    the cold accumulating material being sealed in the tubes.

20. The air conditioning system according to claim 19, further comprising the tubes of the cold accumulator being stacked adjacent each other to define a wave shaded cold air passage between adjacent tubes.

21. The air conditioning system according to claim 16, further comprising:
    the cold accumulator having a tube formed in a serpentine shape to form a plurality of folded tube portions; and
    the cold accumulating material being sealed in the tube.

22. The air conditioning system according to claim 21, further comprising the cold accumulator having a fin disposed between the folded tube portions.

23. The air conditioning system according to claim 21, further comprising a plurality of the tubes, each of which is formed in a serpentine shape, being disposed to be connected integrally.

24. The air conditioning system according to claim 16, further comprising the cold accumulator having a plurality of tubes filled with the cold accumulating material, and a fixing member disposed to fix both ends of each of the tubes.

25. The air conditioning system according to claim 24, further comprising:
    each of the tubes having a flat shape in cross-section;
    the tubes being arranged so that a major direction of the flat shape of each tube is along the air flow direction in the cold accumulator;
    the fixing member having a plurality of recesses arranged to correspond to the arrangement of the tubes; and
    at least one side end of each of the tubes being fitted into respective recess of the fixing member.

26. The air conditioning system according to claim 16, further comprising:
    the cold accumulator having a first cold accumulating portion and a second cold accumulating portion; and
    the cold accumulating material including a first material sealed in the first cold accumulating portion and a second material sealed in the second cold accumulating portion.

27. The air conditioning system according to claim 26, further comprising:
    the cold accumulator having therein an inner partition member; and
    the first cold accumulating portion and the second cold accumulating portion being integrally disposed to be defined by the inner partition member.

28. The air conditioning system according to claim 26, further comprising:

the first material having a melting point higher than that of the second material; and the first cold accumulating portion being disposed at an upstream side of the second cold accumulating portion in the air flow direction.

29. The air conditioning system according to claim 16, further comprising:

the cooling heat exchanger being an evaporator of the refrigerant cycle.

30. The air conditioning system according to claim 16, further comprising:

a control unit for controlling temperature of air to be blown into the passenger compartment; and the control unit controlling temperature of the cooling heat exchanger to a target cooling temperature;

the control unit sets the target cooling temperature at an initial target temperature in a cold accumulation mode; and when the control unit determines a finish of the cold accumulation mode, the control unit sets the target cooling temperature to a temperature that is higher than the initial target temperature.

* * * * *